US012726561B2

(12) United States Patent
Lee et al.

(10) Patent No.: US 12,726,561 B2
(45) Date of Patent: Sep. 1, 2026

(54) ELECTRONIC DEVICE COMPRISING FLEXIBLE DISPLAY, OPERATING METHOD THEREOF, AND STORAGE MEDIUM

(71) Applicant: SAMSUNG ELECTRONICS CO., LTD., Suwon-si (KR)

(72) Inventors: Jongkee Lee, Suwon-si (KR); Eunseok Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 19/092,712

(22) Filed: Mar. 27, 2025

(65) Prior Publication Data

US 2025/0227178 A1 Jul. 10, 2025

Related U.S. Application Data

(63) Continuation of application No. PCT/KR2023/011762, filed on Aug. 9, 2023.

(30) Foreign Application Priority Data

Sep. 27, 2022 (KR) ........................ 10-2022-0122284
Sep. 28, 2022 (KR) ........................ 10-2022-0123420

(51) Int. Cl.
*G06F 3/0481* (2022.01)
*G06F 3/0484* (2022.01)
(Continued)

(52) U.S. Cl.
CPC ...... *H04M 1/72454* (2021.01); *G06F 3/0481* (2013.01); *G06F 3/0484* (2013.01);
(Continued)

(58) Field of Classification Search
CPC ........... H04M 1/72454; H04M 1/0214; H04M 1/0243; H04M 1/0268; H04M 1/72403;
(Continued)

(56) References Cited

U.S. PATENT DOCUMENTS

2010/0064244 A1 3/2010 Kilpatrick et al.
2013/0229324 A1 9/2013 Zhang et al.
(Continued)

FOREIGN PATENT DOCUMENTS

CN 112889027 A 6/2021
CN 114365074 A 4/2022
(Continued)

OTHER PUBLICATIONS

International Search Report (PCT/ISA/210) and Written Opinion (PCT/ISA/237) issued Nov. 21, 2023 by the International Searching Authority in International Patent Application No. PCT/KR2023/011762.

(Continued)

*Primary Examiner* — Rodney Amadiz
(74) *Attorney, Agent, or Firm* — Sughrue Mion, PLLC

(57) ABSTRACT

An electronic device includes: a flexible display; and at least one processor configured to: display, via the flexible display, a first window of an application in a state in which the display is unfolded; display, via the flexible display, a second window on an area of the first window, based on an input for displaying the second window; and display, via the flexible display, the first window in a first display area and the second window in a second display area in a state in which the display is at least partially folded, the first display area and the second display area being separate from each other and divided by a folding in the flexible display.

20 Claims, 19 Drawing Sheets

(51) Int. Cl.
*G06F 3/04886* (2022.01)
*H04M 1/02* (2006.01)
*H04M 1/72403* (2021.01)
*H04M 1/72454* (2021.01)

(52) U.S. Cl.
CPC ...... *G06F 3/04886* (2013.01); *H04M 1/0214* (2013.01); *H04M 1/0243* (2013.01); *H04M 1/0268* (2013.01); *H04M 1/72403* (2021.01)

(58) Field of Classification Search
CPC ...... H04M 1/02; G06F 3/0481; G06F 3/0484; G06F 3/04886; G06F 1/1616; G06F 1/1652; G06F 3/0485; G06F 2203/04803; G06F 1/1677; G06F 3/04883
See application file for complete search history.

(56) References Cited

U.S. PATENT DOCUMENTS

| | | | |
|---|---|---|---|
| 2014/0089833 | A1 | 3/2014 | Hwang et al. |
| 2015/0022436 | A1 | 1/2015 | Cho et al. |
| 2015/0325216 | A1 | 11/2015 | Park et al. |
| 2016/0139685 | A1* | 5/2016 | Yang .................... G06F 3/1446 345/173 |
| 2016/0259514 | A1 | 9/2016 | Sang et al. |
| 2018/0039408 | A1 | 2/2018 | Cheong et al. |
| 2019/0288916 | A1* | 9/2019 | Ricci ................ B60R 21/01512 |
| 2020/0027425 | A1 | 1/2020 | Lee et al. |
| 2020/0089459 | A1 | 3/2020 | Zhang |
| 2020/0133403 | A1 | 4/2020 | Sharma et al. |
| 2021/0150953 | A1 | 5/2021 | Lee et al. |
| 2021/0247805 | A1 | 8/2021 | Min et al. |
| 2021/0342044 | A1 | 11/2021 | Xu |
| 2022/0269314 | A1 | 8/2022 | Chen et al. |
| 2023/0341907 | A1 | 10/2023 | Lee et al. |

FOREIGN PATENT DOCUMENTS

| | | | |
|---|---|---|---|
| EP | 3 879 401 | A1 | 9/2021 |
| KR | 10-2014-0039575 | A | 4/2014 |
| KR | 10-2015-0011103 | A | 1/2015 |
| KR | 10-2016-0108705 | A | 9/2016 |
| KR | 10-2018-0015533 | A | 2/2018 |
| KR | 10-2021-0060874 | A | 5/2021 |
| KR | 10-2262721 | B1 | 6/2021 |
| KR | 10-2022-0103374 | A | 7/2022 |

OTHER PUBLICATIONS

Communication issued Nov. 3, 2025 by the European Patent Office in European Patent Application No. 23872781.2.

* cited by examiner (a)

(b)

(c)

(a)

Folding (b)

ELECTRONIC DEVICE COMPRISING FLEXIBLE DISPLAY, OPERATING METHOD THEREOF, AND STORAGE MEDIUM

CROSS-REFERENCE TO RELATED APPLICATIONS

This application is a continuation of International Application No. PCT/KR2023/011762, filed on Aug. 9, 2023, which is based on and claims priority to Korean Patent Application No. 10-2022-0122284, filed on Sep. 27, 2022, in the Korean Intellectual Property Office, and Korean Patent Application No. 10-2022-0123420, filed on Sep. 28, 2022, in the Korean Intellectual Property Office, the disclosures of which are incorporated by reference herein in their entireties.

BACKGROUND

1. Field

The disclosure relates to an electronic device including a flexible display, a method of operating the same, and a storage medium.

2. Description of Related Art

Various types of flexible electronic devices are under development with the improvement of technology. Such a flexible electronic device may provide a larger display, while ensuring portability. For example, a flexible electronic device may provide a foldable (or bendable) or rollable display, which is deformable by applying a force by a user.

In an electronic device including a fold-type flexible display, a screen may be displayed on a display (or display area) of various sizes. For example, when the electronic device is placed upright and folded in half, a user may view a screen (e.g., content screen) in a hands-free state. Therefore, providing various user interfaces that reflect the user's intention for an action of bending the electronic device with the flexible display may improve the usability of the electronic device.

SUMMARY

According to an aspect of the disclosure, an electronic device includes: a flexible display; at least one sensor; at least one processor; and memory storing instructions that, when executed by the one or more processors individually or collectively, cause the electronic device: display, via the flexible display, a first window of an application in an entire display area that includes a first display area and a second display area in a state in which the display is unfolded; display, via the flexible display, a second window to partially overlay at least a portion of the first window, based on an input for displaying the second window; detect a folding event of the flexible display using the at least one sensor; and in response to the detection of the folding event, display, via the flexible display, the first window in the first display area and the second window in the second display area in a state in which the display is at least partially folded, the first display area and the second display area being separate from each other and divided by a folding in the flexible display.

The instructions are further configured to, when executed by the one or more processors individually or collectively, cause the electronic device to: control the first window based on a first interaction input into the flexible display in a designated direction; and control the second window based on a second interaction input into the flexible display in the designated direction or a different direction than the designated direction.

In the state in which the flexible display is unfolded, the first window or the second window may be in an active state in which an interaction input is enabled. In the state in which the flexible display is at least partially folded, each of the first window and the second window may be in the active state in which the interaction input is enabled.

The instructions are further configured to, when executed by the one or more processors individually or collectively, cause the electronic device to: detect a folding event of the flexible display; and in response to the detection of the folding event, separately display the first window in the first display area of the flexible display and the second window in the second display area of the flexible display.

The first window may correspond to an execution screen of the application, and the second window may include content associated with the execution screen of the application.

The instructions are further configured to, when executed by the one or more processors individually or collectively, cause the electronic device to: detect a folding event of the flexible display; in response to the detection of the folding event, identify whether the first window and the second window enable different interaction inputs; and in response to the identification of the first window and the second window enabling different interaction inputs, separately display the first window in the first display area of the flexible display and the second window in the second display area of the flexible display based on a hinge of the flexible display.

The instructions are further configured to, when executed by the one or more processors individually or collectively, cause the electronic device to: detect a folding event of the flexible display; in response to the detection of the folding event, identify whether the first window of the application displayed in the state in which the flexible display is unfolded comprises two areas enabling different interaction inputs, respectively; and in response to the identification of the first window comprising the two areas enabling different interaction inputs, divide an entire area of the flexible display into the first display area and the second display area according to a position of the folding.

The instructions are further configured to, when executed by the one or more processors individually or collectively, cause the electronic device to: detect a folding event of the flexible display; in response to the detection of the folding event, identify whether the first window of the application displayed in the state in which the flexible display is unfolded comprises a first area and a second area enabling different interaction inputs, and in response to the identification of the first window comprising the first area and the second area enabling different interaction inputs, separately display the first area in the first display area and the second area in the second display area divided by the folding, in the state in which the flexible display is at least partially folded.

In a state in which the first window of the application includes a first area and a second area enabling different interaction inputs, The instructions are further configured to, when executed by the one or more processors individually or collectively, cause the electronic device to: control the first area based on a first interaction input into the flexible display in a designated direction; and control the second area based on a second interaction input into the flexible display in a different direction than the designated direction.

In a state in which the flexible display is in an unfolded states and a first area of the first window is controlled based on a first interaction input in a designated direction, and a second area of the first window is controlled based on a second interaction input in a direction different than the designated direction, The instructions are further configured to, when executed by the one or more processors individually or collectively, cause the electronic device to separately display the first area controlled based on the first interaction input in the designated direction in the first display area and the second area controlled based on the second interaction input in a different direction than the designated direction in the second display area divided by the folding in a state in which the flexible display is at least partially folded.

According to another aspect of the disclosure, a method of operating an electronic device including a flexible display includes: displaying a first window of an application in an entire display area that includes a first display area and a second display area in a state in which the flexible display is unfolded; displaying a second window to partially overlay at least a portion of the first window, based on an input for displaying the second window; detect a folding event of the flexible display using at least one sensor; and in response to the detection of the folding event, displaying the first window in the first display area and the second window in the second display area in a state in which the flexible display is at least partially folded, the first display area and the second display area being separate from each other and divided by a folding in the flexible display.

The method may further include: controlling the first window based on a first interaction input into the flexible display in a designated direction; and controlling the second window based on a second interaction input into the flexible display in the designated direction or a different direction than the designated direction.

In the state in which the flexible display is unfolded, the first window or the second window may be in an active state in which an interaction input is enabled. In the state in which the flexible display is at least partially folded, each of the first window and the second window may be in the active state in which the interaction input is enabled.

The first window may correspond to an execution screen of the application. The second window may include content associated with the execution screen of the application.

The method may further include: detecting a folding event of the flexible display; in response to the detection of the folding event, identifying whether the first window and the second window enable different interaction inputs; and in response to the identification of the first window and the second window enabling different interaction inputs, separately displaying the first window in the first display area of the flexible display and the second window in the second display area of the flexible display based on a hinge of the flexible display.

According to yet another aspect of the disclosure, a non-transitory storage medium storing instructions is configured to enable an electronic device to perform at least one operation when executed by at least one processor of the electronic device, the at least one operation includes: displaying a first window of an application in an entire display area that includes a first display area and a second display area in a state in which a flexible display of the electronic device is unfolded; displaying a second window to partially overlay at least a portion of the first window, based on an input for displaying the second window; detect a folding event of the flexible display using at least one sensor; in response to the detection of the folding event, displaying the first window in the first display area and the second window in the second display area in a state in which the flexible display is at least partially folded, the first display area and the second display area being separate from each other and divided by a folding in the flexible display.

The at least one operation may further include: controlling the first window based on a first interaction input into the flexible display in a designated direction; and controlling the second window based on a second interaction input into the flexible display in the designated direction or a different direction than the designated direction.

In the state in which the flexible display is unfolded, the first window or the second window may be in an active state in which a first interaction input is enabled. In the state in which the flexible display is at least partially folded, each of the first window and the second window may be in the active state in which a second interaction input is enabled.

The first window may correspond to an execution screen of the application. The second window may include content associated with the execution screen of the application.

The at least one operation may further include: detecting a folding event of the flexible display; in response to the detection of the folding event, identifying whether the first window and the second window enable different interaction inputs; and in response to the identification of the first window and the second window enabling different interaction inputs, separately displaying the first window in the first display area of the flexible display and the second window in the second display area of the flexible display based on a hinge of the flexible display.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
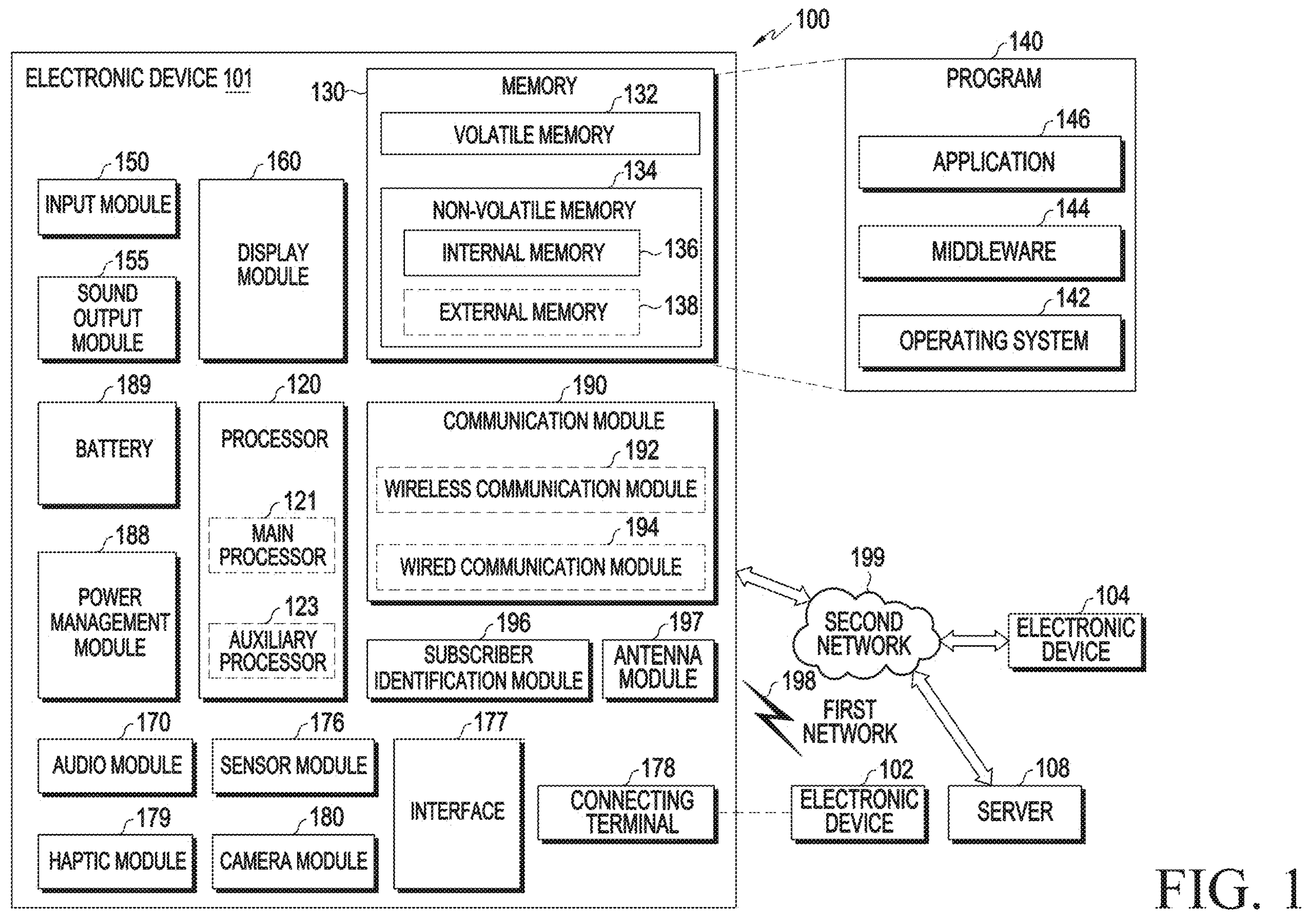
FIG. 1 is a block diagram illustrating an electronic device in a network environment according to one or more embodiments.

FIG. 1 is a block diagram illustrating an electronic device 101 in a network environment 100 according to an embodiment. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the strength of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to some embodiments, another component (e.g., a radio frequency integrated circuit (RFIC)) other than the radiating element may be additionally formed as part of the antenna module 197.

According to an embodiment, the antenna module 197 may form an mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
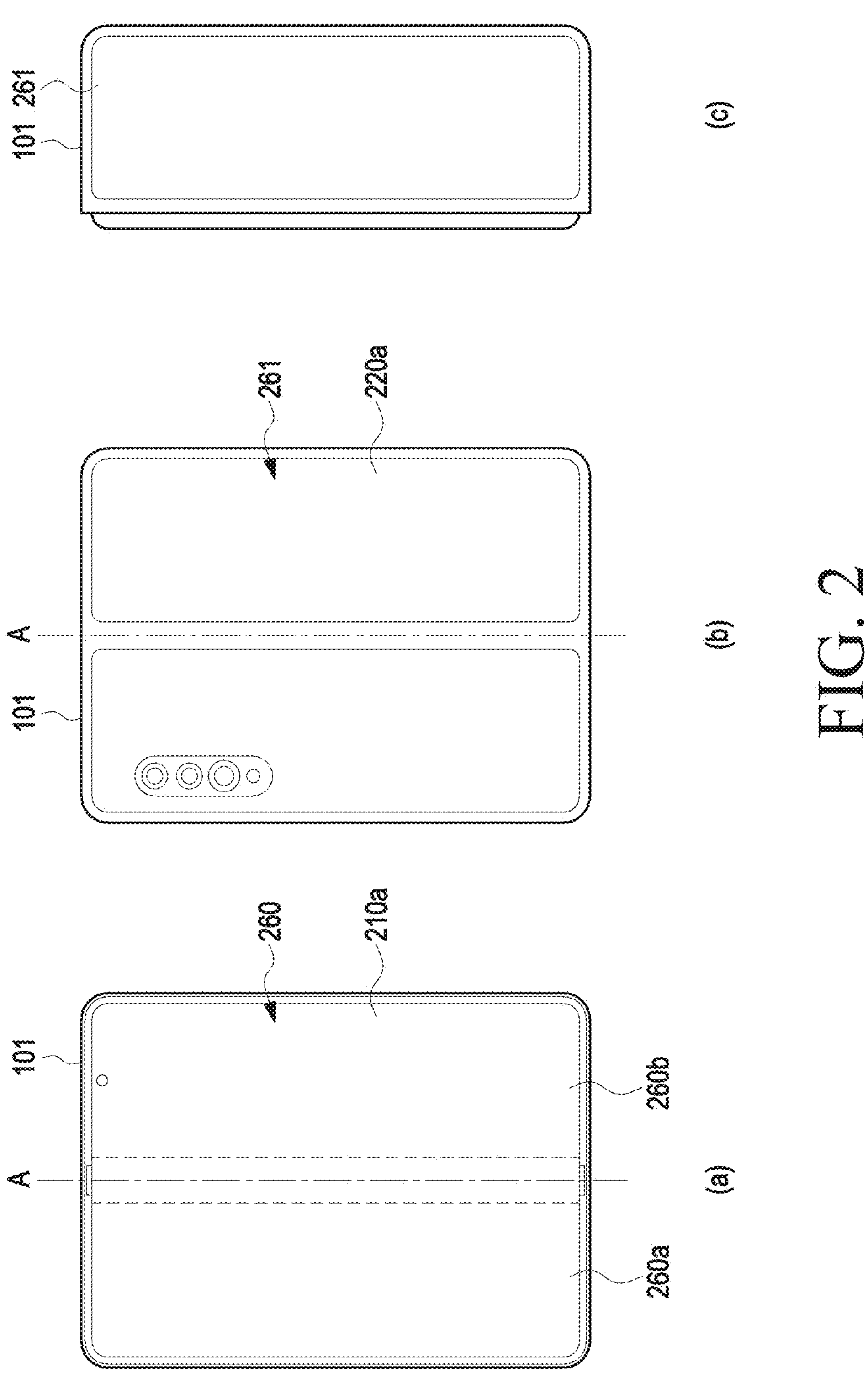
FIG. 2 is a diagram illustrating an unfolded state and a folded state of an electronic device of a first shape according to one or more embodiments.

FIG. 2 is a diagram illustrating an unfolded state and a folded state of an electronic device of a first shape according to one or more embodiments.

Referring to FIG. 2, in one or more embodiments, the electronic device 101 may include a foldable housing and a flexible or foldable display 260 disposed within a space formed by the foldable housing. The foldable housing may have a shape substantially symmetrical with respect to a folding axis (e.g., an axis A). According to one or more embodiments, a surface on which a first display 260 is disposed may be defined as a first surface 210*a* of the electronic device 101, and a surface opposite to the first surface 210*a* may be defined as a second surface 220*a*. Herein, the surface on which the first display 260 is disposed may be defined as the first surface 210*a* or the front surface of the electronic device 101, and the surface opposite to the front surface may be defined as the second surface 220*a* or the rear surface of the electronic device 101.

Referring to FIG. 2, the electronic device 101 may have the first shape in which a longitudinal length is greater than a horizontal length on the front surface thereof. For example, the electronic device 101 of the first shape may be referred to as a fold electronic device, and a state in which bottom surfaces of a body face downward with respect to the folding axis (e.g., the axis A) in the electronic device 101 of the first shape may be referred to as a portrait mode. Further, a state in which one of both side surfaces of the body faces downward with respect to the folding axis (e.g., the axis A) in the electronic device of the first shape may be referred to as a landscape mode.

As illustrated in FIG. 2(*a*), the first display 260 may be formed to occupy the entire first surface 210*a* of the electronic device 101, and as illustrated in FIG. 2(*b*), a second display 261 may be formed to occupy at least a portion of the second surface 220*a*. In this case, the first display 260 may pivot through a separate hinge module, and the second display 261 may be fixed to the housing. For example, the hinge structure may be configured to be folded or unfolded inwardly or outwardly. For example, a free stop hinge may maintain the electronic device 101 in the folded state at various angles.

For example, the second display 261 may be disposed on one of a pair of housings disposed on both sides of the folding axis (e.g., the axis A). According to one or more embodiments, the first display 260 may refer to a flexible display in which at least a partial area is deformable into a flat or curved surface. The first display 260 may include a first area (or first display area) 260*a* disposed on one side of the folding axis (e.g., the axis A) and a second area (or second display area) 260*b* disposed on the other side thereof.

For example, when the electronic device 101 is in the unfolded state (e.g., flat state), a surface of the first area 260*a* and a surface of the second area 260*b* may form an angle of 180 degrees with each other and face the same direction (e.g., a front direction of the electronic device 101).

As illustrated in FIG. 2(*c*), when the electronic device 101 is in the folded state, the surface of the first area 260*a* of the first display 260 and the surface of the second area 260*b* may form a narrow angle (e.g., between 0 and 10 degrees) with each other and face each other. According to one or more embodiments, when the electronic device 101 is in the folded state, the second display 261 may be disposed on one of the pair of housings disposed on both sides of the folding axis (e.g., the axis A). However, according to one or more other embodiments, the second display 261 may form most of the rear surface 220*a* depending on its structure or function. For example, the electronic device 101 may include the second display 261 which is at least partially exposed visually through a rear cover. Therefore, it is to be noted that the sizes and shapes of the first display 260 and the second display 261 are not limited thereto. Further, the area division of the first display 260 illustrated in FIG. 2(*a*) is exemplary, and the first display 260 may be divided into a plurality of areas (e.g., four or more areas or two areas) depending on its structure or function.

Figure 3A:
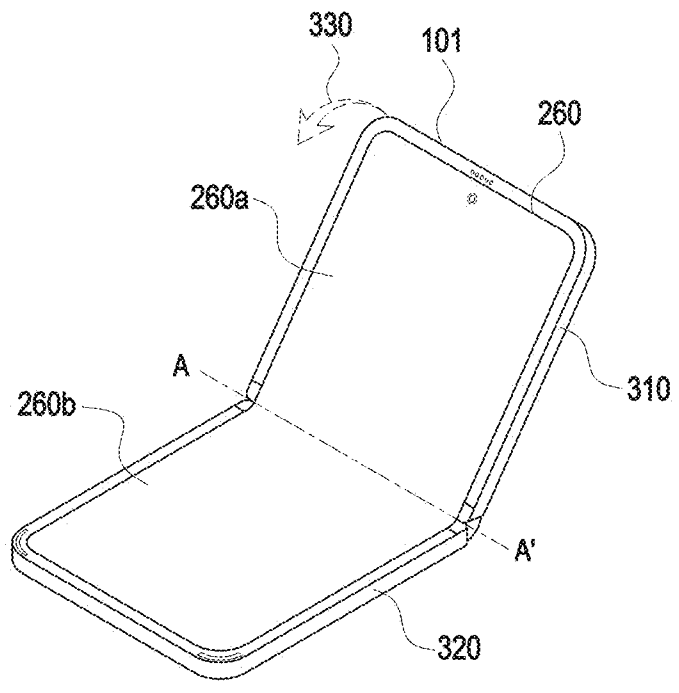
FIG. 3A is a diagram illustrating a folded state of an electronic device of a second shape in a portrait mode according to one or more embodiments.
Figure 3B:
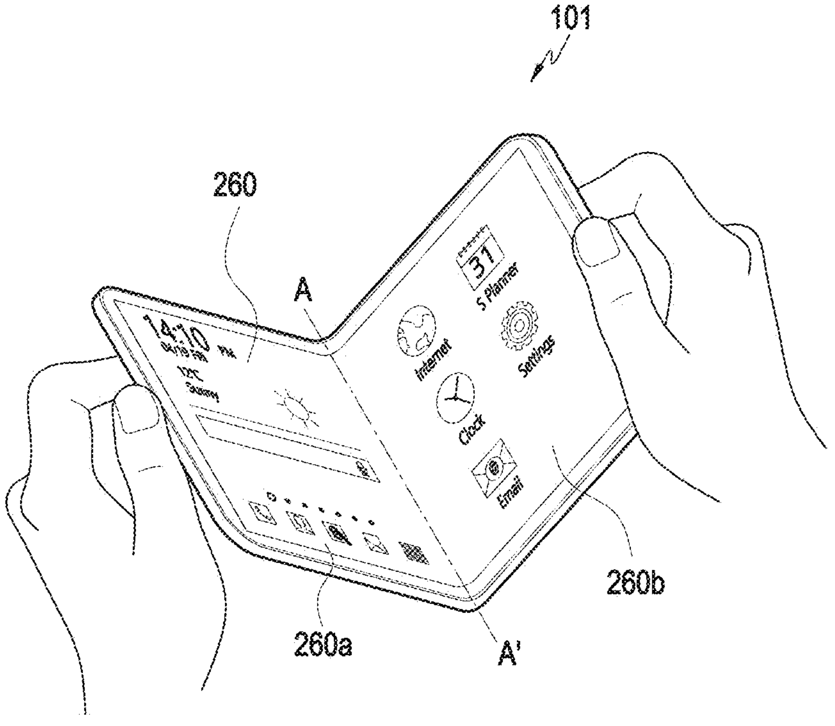
FIG. 3B is a diagram illustrating a folded state of an electronic device of a second shape in a landscape mode according to one or more embodiments.

FIG. 3A is a diagram illustrating a folded state of an electronic device of a second shape in a portrait mode according to one or more embodiments, and FIG. 3B is a diagram illustrating a folded state of the electronic device of the second shape in a landscape mode according to one or more embodiments.

For example, the electronic device 101 of the second shape may be referred to as a flip electronic device, and as illustrated in FIG. 3A, a state in which the electronic device 101 of the second shape is placed upright, while being folded in half inwardly with respect to a folding axis (e.g., an axis A-A'), such as in a compact form, may be referred to as the portrait mode. Further, a state in which the electronic device 101 of the second shape is folded inwardly with respect to the folding axis (e.g., the axis A-A') may be referred to as the landscape mode.

As illustrated in FIG. 3A, when the electronic device 101 is folded in a forward direction 330 by the user, it may be in a partially unfolded state with respect to the folding axis (e.g., the axis A-A'). This folding method may be referred to as an in-folding method.

The electronic device 101 may be in a state in which a first housing structure 320 is in contact with a contact surface (e.g., a floor or a table), and a second housing structure 310 is placed upright on the contact surface. In this way, the electronic device 101 including the flexible display may be folded or bent with respect to one axis. According to one or more embodiments, when the electronic device 101 is in the partially folded state in the portrait mode, the first display 260 may be divided into the first display area 260*a* and the second display area 260*b* above and below each other with respect to the folding axis. In the portrait mode, the first display area 260*a* corresponding to an upper part viewed by the user with respect to the folding axis may be referred to as an upper area of the first display 260 (or internal display), and the second display area 260*b* corresponding to a lower part may be referred to as a lower area of the first display 260 (or internal display). At least one of the first display area 260*a* or the second display area 260*b* may include a front camera.

As illustrated in FIG. 3B, the electronic device 101 may be in the partially unfolded state with respect to the folding axis (e.g., the axis A-A') by a force and bending motion applied by both hands of the user.

According to one or more embodiments, when the electronic device 101 is in the partially folded state in the landscape mode, the first display 260 may be divided into the first display area 260*a* and the second display area 260*b* to the left and right with respect to the folding axis. In the landscape mode, the first display area 260*a* corresponding to a left side viewed by the user with respect to the folding axis may be referred to as a left area of the first display 260 (or internal display), and the second display area 260*b* corresponding to a right side may be referred to as a right area of the first display 260 (or internal display).

Figure 4:
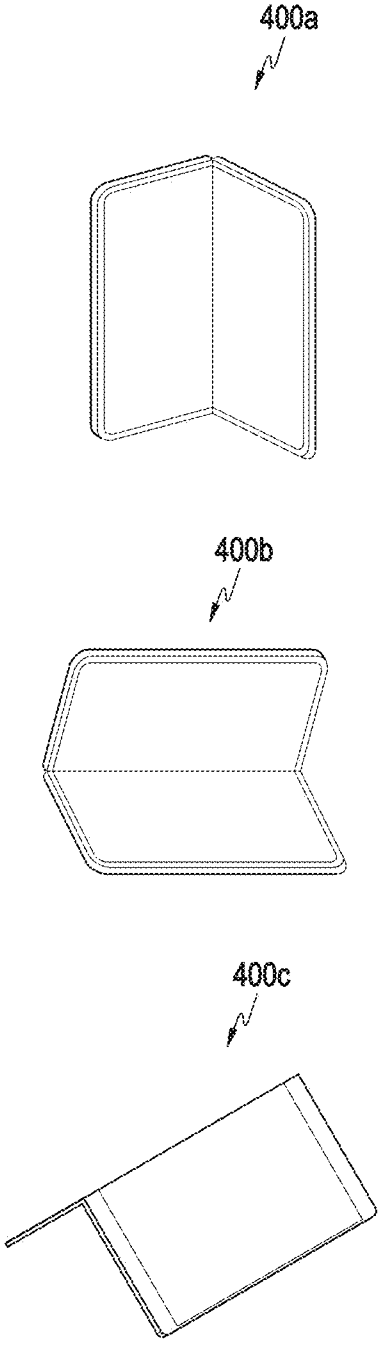
FIG. 4 is a perspective view illustrating various folded states of an electronic device according to one or more embodiments.

According to one or more embodiments, when at least a portion of the first display 260 is folded, the electronic device 101 illustrated in FIG. 2 may be in various folded states depending on mounted states (or postures), as illustrated in FIG. 4. FIG. 4 is a perspective view illustrating various folded states of an electronic device according to one or more embodiments.

The electronic device 101 may be in various partially folded states 400*a*, 400*b*, and 400*c*, as illustrated in FIG. 4. The electronic device 101 may be in a state in which it is placed upright, while being folded in half inwardly, such as a compact form. According to one or more embodiments, when the electronic device 101 is in mounted states or postures as illustrated in 400*a* to 400*c* of FIG. 4, both the first display area and the second display area of the first display, which are divided by a folding of the first display 260, may be in an active state in which a user input is enabled. According to one or more embodiments, an interaction input through the first display area and an interaction input through the second display area may be independent of each other. For example, when the first display area is controlled based on an interaction input in a designated direction, the second display area may be controlled based on an interaction input in the designated direction or a different direction. The interaction input may be an input that is input into the first display 260.

Further, according to one or more embodiments, as the electronic device 101 forms an angle between the first housing structure (e.g., 320 in FIG. 3A) and the second housing structure (e.g., 310 in FIG. 3A), and thus side surfaces of the body support a contact surface, the electronic device 101 may be in the state 400*c* in which it is placed upright. This folding method may be referred to as an out-folding method. Even when the electronic device 101 is folded outwardly, an interaction input to one area (or one surface) of the display and an interaction input to another area (or another surface) of the display may be independent of each other.

According to one or more embodiments, when the first display 260 of the electronic device 101 is in the unfolded state, a second window partially overlapping the first window may be displayed through the first display 260. According to one or more embodiments, while the second window is displayed on the first window, the electronic device 101 may display the first window and the second window, respectively in the first display area and the second display area divided by folding in response to a folding event. An execution screen of an application may be displayed on the first window, and content associated with the execution screen of the application may be displayed on the second window.

For example, different windows may be disposed in the first display area and the second display area, respectively, and various user interfaces related to the running application may be implemented on the windows.

According to one or more embodiments, when the first display 260 of the electronic device 101 is in the unfolded state, a first area and a second area enabling independent interaction inputs may be displayed through the first display 260. For example, the first window may include the first area and the second area. According to one or more embodiments, while the first area and the second area are displayed, the electronic device 101 may separately display the first area and the second area respectively in the first display area and the second display area divided by folding, in response to a folding event.

As described above, when various user interfaces that reflect the user's intention for an action of bending the electronic device 101 with the flexible display may be provided, the usability of the electronic device 101 may be improved.

According to one or more embodiments, the at least partially folded state of the display may be referred to as a flex mode, and the electronic device 101 may be maintained in the folded state at various angles. Although the electronic device is foldable in half with respect to the center of the electronic device, the folding ratio may be implemented differently based on the axis.

The axis may be preset or arbitrary. A preset axis may mean that only a specific area (e.g., a partial area including the axis) of the flexible display of the electronic device 101 is bendable. On the other hand, an arbitrary axis may mean that the entire area of the display of the electronic device 101 is bendable. Although FIGS. 2 to 4 illustrate that the electronic device 101 is folded in half with respect to an axis passing through the center of the electronic device 101, those skilled in the art will easily understand that the location of the axis is not limited.

Further, the 'front surface' or 'rear surface' of the electronic device 101 may be mentioned in the following detailed description, and regardless of the relative positions (e.g., unfolded or folded states) of the first housing structure (e.g., 320 in FIG. 3A) and the second housing structure (e.g., 310 in FIG. 3A), the surface on which the first display 260 of FIG. 2 is disposed is defined as the 'front surface of the electronic device 101', and the surface on which the second display 261 is disposed, facing in the opposite direction to the surface on which the first display 260 is disposed, is defined as the 'rear surface of the electronic device 101'. According to one or more embodiments, a "display" may refer to a flexible display. For example, the first display 260 of FIG. 2, FIG. 3A or FIG. 3B may refer to a flexible display.

In the following detailed description, the same reference numerals or no reference numerals are assigned to components readily understandable from the preceding embodiments in the drawings, and a detailed description of the components may be avoided. The electronic device 101 according to one or more embodiments of the disclosure may be implemented by selectively combining components of different embodiments, and a component of one or more embodiments may be replaced by a component of another embodiment. For example, it is to be noted that the disclosure is not limited to a specific drawing or embodiment.

Figure 5:
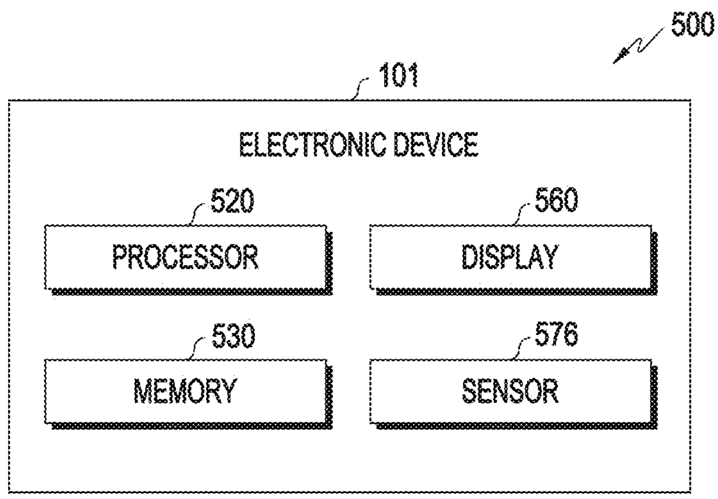
FIG. 5 is an internal block diagram illustrating an electronic device according to one or more embodiments.

FIG. 5 is an internal block diagram 500 illustrating an electronic device according to one or more embodiments.

Referring to FIG. 5, the electronic device 101 (e.g., the electronic device 101 of FIG. 1) according to one or more embodiments may include a processor 520 (e.g., the processor 120 in FIG. 1, memory 530 (e.g., the memory 130 in FIG. 1), a display 560 (e.g., the display module 160 in FIG. 1), a sensor 576 (e.g., the sensor module 176 in FIG. 1), and/or a communication module 590 (e.g., the communication module 190 in FIG. 1). All components illustrated in FIG. 5 are not essential for the electronic device 101, and the electronic device 101 may be implemented with more or fewer components than the components illustrated in FIG. 5.

The display 560 may refer to a flexible display. According to one or more embodiments, the display 560 may include the first display 260 and the second display 261, as illustrated in FIGS. 2 to 3B. Since the following description is given with the appreciation that the display 560 is folded in the forward direction 330 of FIG. 3A by way of example, it is to be understood that the display 560 corresponds to the first display 260.

For example, as the display 560 is at least partially folded, the display 560 may be divided into a first display area and a second display area. According to one or more embodiments, the partially folded state (e.g., flex mode) of the display 560 may mean a state in which at least a portion of the display 560 is visually exposed to the outside.

For example, when the display 560 is at least partially folded with respect to a common boundary line, the entire screen of the display 560 may include the first display area and the second display area. The first display area may be controlled based on an interaction input in a designated direction, and the second display area may be controlled based on an interaction input in the designated direction or a different direction. For example, since the first display area and the second display area are controlled based on independent interaction inputs, simultaneous inputs and simultaneous control may be possible. An interaction input such as navigation or scrolling according to a running application may be applied in each of areas divided by folding, and includes various user inputs such as a text input in addition to 4-direction navigation and a vertical or horizontal scrolling input.

The sensor 576 may include a sensor (e.g., a digital Hall sensor or a 6-axis sensor) for determining an operating state (e.g., an unfolded state, a folded state, and/or an intermediate state) and a folding angle of the electronic device 101. Further, the sensor 576 may also include a strain sensor that outputs a strain value used to indirectly measure the folding angle of the electronic device 101.

The processor 520 may detect a physical state of the electronic device 101 and/or a change in the physical state, based on data received from the sensor 576. The processor 520 may detect a change (e.g., a folding event or an unfolding event) in the operating state (e.g., the unfolded state, the folded state, and/or the partially folded intermediate state). For example, when detecting that an angle between a first housing structure (e.g., 320 in FIG. 3A) and a second housing structure (e.g., 310 in FIG. 3A) falls within a specified angle range based on the sensor capable of detecting a change in the operating state, it may be determined that the electronic device 101 is in the partially unfolded (or partially folded) state.

The processor 520 may execute at least one application and visually output content corresponding to the application through the display 560. The processor 520 may execute the application in response to a request for executing the application from the user. For example, the processor 520 may output an execution screen of the application through at least a portion (e.g., the entire screen) of the display 560 in response to the execution of the application in the unfolded state of the display 560. The execution screen of the application, which is an output result of the current running application, may include a data object generated while the application is being executed, for example, at least one of video data, audio data, or display information. Further, the execution screen of the application on the display 560 may be referred to as content, and may also be referred to as data related to the running application, or screen data.

Figure 6:
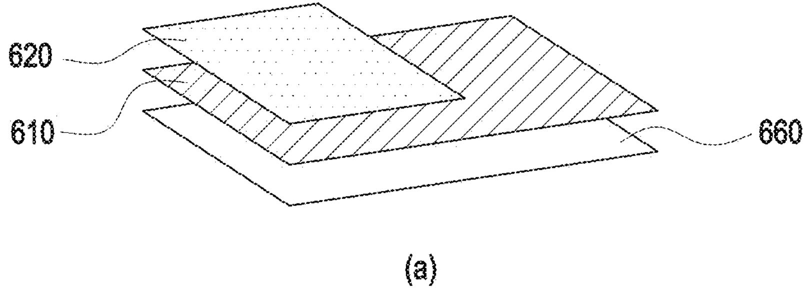
FIG. 6 is a diagram illustrating a method of operating multiple windows in an unfolded state and a partially folded state of an electronic device according to one or more embodiments.
Figure 6:
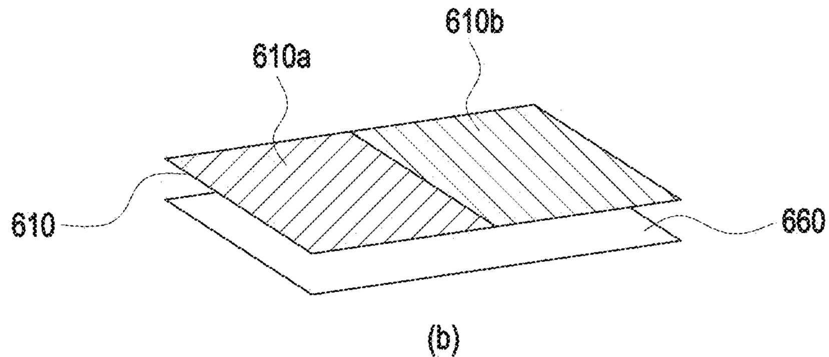
Figure 6:
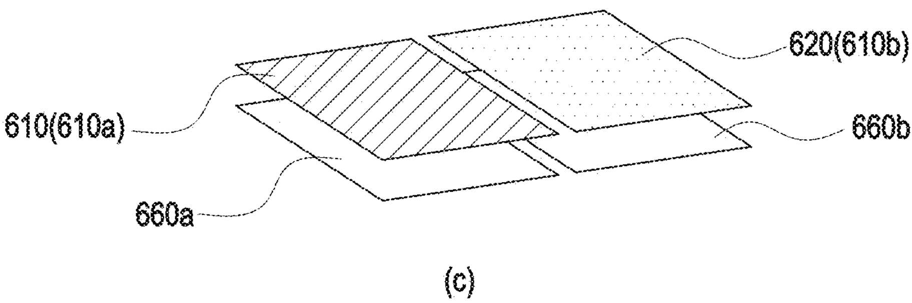

According to one or more embodiments, a screen interface for supporting a multi-window environment may be configured in a method in which two or more windows are displayed overlapped on one screen, and a method in which one screen is displayed separately into two or more areas, when the display 560 is in the unfolded state. To describe the methods in detail, reference may be made to FIG. 6. FIG. 6 is a diagram illustrating a method of operating multiple windows in the unfolded state and partially folded state of an electronic device according to one or more embodiments.

For example, in a method in which two or more windows 610 and 620 are displayed overlapped as illustrated in FIG. 6(*a*), the plurality of windows 610 and 620 may be provided in a layered structure on one layout 660 in the unfolded state of the display 560. One of the two or more windows 610 and 620 may be in an active state in which an interaction input is enabled. For example, an input may be enabled on the uppermost window 620, and when the window 610 covered by the uppermost window 620 is selected, the uppermost window 620 may be in an inactive state in which an interaction input is disabled, and the selected window 610 may be in the active state in which an interaction input is enabled.

For example, in the case of the method in which one screen is displayed divided into two or more areas 610*a* and 610*b* as illustrated in FIG. 6(*b*), one window 610 may be provided on the single layout 660 in the unfolded state of the display 560. While a case in which the single window 610 is configured to include the areas 610*a* and 610*b* enabling different interaction inputs is described with reference to FIG. 6(*b*) by way of example, for convenience of description, this is only an example, and the first area 610*a* and the second area 610*b* may also be referred to as a first window and a second window, respectively. One of the two or more areas 610*a* and 610*b* may be in the active state in which an interaction input is enabled. Therefore, the two areas may be controlled selectively rather than simultaneously.

When a screen interface is implemented such that upon occurrence of a folding event of the display 560, an independent interaction input may be made in each of areas divided by folding rather than the layout is simply optimized in the areas, the divided screens may be efficiently controlled. According to one or more embodiments, as one screen is divided into two areas by a folding event that bends the flexible display, intuitive screen control is possible for each area, thereby improving usability.

According to one or more embodiments, in the case of the method in which the two or more windows 610 and 620 are displayed overlapped as in FIG. 6(*a*), the processor 520 may display the first window 610 of the application through the display 560 in the unfolded state of the display 560. The first window 610 may correspond to the execution screen of the application. In response to an input for displaying the second window 620 while displaying the first window 610, the processor 520 may display the second window 620 on at least a portion of the first window 610.

For example, the first window 610 is a window displayed on the entire area of the display 560 and may be referred to as a main window. The main window may include data generated during an execution of an application (or task), and may refer to an image output on the display 560 by an application executed in a foreground environment. The second window 620 is a sub-window displayed as a window smaller than the area of the display 560, and may be displayed overlapped on a portion of the main window, as functions (or items) provided by the application are selected during the execution of the application. Since the first window 610 corresponds to the execution screen of the application, the user may manipulate a specific item displayed on the execution screen or perform a manipulation to navigate the execution screen. Accordingly, the first window 610 may be controlled based on an interaction input in a designated direction. Further, the second window 620 displayed overlapped on the first window 610 may be controlled based on an interaction input in the designated direction or a different direction.

According to one or more embodiments, the processor 520 may detect the folding event of the display 560 using the sensor 576 while the second window 620 is displayed on the first window 610. For example, when different interaction inputs are enabled on the first window 610 and the second window 620, the processor 520 may separately display the first window 610 and the second window 620 in the first display area 660*a* and the second display area 660*b* of the display 56 divided by folding, respectively, in response to the folding event, as illustrated in FIG. 6(*c*).

According to one or more embodiments, with one screen displayed divided into the two or more areas 610*a* and 610*b* as illustrated in FIG. 6(*b*), the processor 520 may detect a folding event of the display 560. For example, when the first area 610*a* and the second area 610*b* enable different interaction inputs, the processor 520 may separately display the first area 610*a* and the second area 610*b* in the first display area 660*a* and the second display area 660*b* of the display 560 divided by folding, respectively, in response to the folding event, as illustrated in FIG. 6(*c*). The first area 610*a* and the second area 610*b* may be included, for example, in the first window 610, and the first area 610*a* may be controlled based on an interaction input in a designated direction, and the second area 610*b* may be controlled based on an interaction input in a different direction.

As described above, an interaction input such as navigation or scrolling according to a running application may be performed independently in each display area divided by folding.

According to one or more embodiments, the electronic device 101 may include the flexible display 160, 260, or 560, the at least one processor 120 or 520 and memory 130 or 530 storing instructions. According to one or more embodiments, the instructions may be configured to, when executed by the one or more processors individually or collectively, cause the electronic device to display a first window of an application through the display in a state where the display is unfolded. According to one or more embodiments, the at least one processor may be configured to display a second window in an area of the first window based on an input for displaying the second window. According to one or more embodiments, the at least one processor may be configured to separately display the first window and the second window in a first display area and a second display area divided by folding, respectively in a state where the display is at least partially folded.

According to an aspect of the disclosure, an electronic device includes: a flexible display; at least one sensor; at least one processor; and memory storing instructions that, when executed by the one or more processors individually or collectively, cause the electronic device: display, via the flexible display, a first window of an application in an entire display area that includes a first display area and a second display area in a state in which the display is unfolded; display, via the flexible display, a second window to partially overlay at least a portion of the first window, based on an input for displaying the second window; detect a folding event of the flexible display using the at least one sensor; and in response to the detection of the folding event, display, via the flexible display, the first window in the first display area and the second window in the second display area in a state in which the display is at least partially folded, the first display area and the second display area being separate from each other and divided by a folding in the flexible display According to one or more embodiments, the instructions may be configured to, when executed by the one or more processors individually or collectively, cause the electronic device to control the first window based on a first interaction input into the flexible display in a designated direction, and to control the second window based on a second interaction input into the flexible display in the designated direction or a different direction than the designated direction.

According to one or more embodiments, in the state in which the flexible display is unfolded, the first window or the second window may be in an active state in which an interaction input is enabled, and in the state in which the flexible display is at least partially folded, each of the first window and the second window may be in the active state in which the interaction input is enabled.

According to one or more embodiments, the instructions may be configured to, when executed by the one or more processors individually or collectively, cause the electronic device to detect a folding event of the flexible display, and in response to the detection of the folding event, to separately display the first window in the first display area of the flexible display and the second window in the second display area of the flexible display based on a hinge of the flexible display.

According to one or more embodiments, the first window may correspond to an execution screen of the application, and the second window may comprise content associated with the execution screen of the application.

According to one or more embodiments, the instructions may be configured to, when executed by the one or more processors individually or collectively, cause the electronic device to detect a folding event of the flexible display, identify whether the first window and the second window enable different interaction inputs in response to the detection of the folding event, and separately display the first window in the first display area of the flexible display and the second window in the second display area of the flexible display, in response to the identification of the first window and the second window enabling different interaction inputs.

According to one or more embodiments, the instructions may be configured to, when executed by the one or more processors individually or collectively, cause the electronic device to detect a folding event of the flexible display, and in response to the detection of the folding event, identify whether the first window of the application displayed on the flexible display in the state in which the flexible display is unfolded comprises two areas enabling different interaction inputs, respectively, and in response to the identification of the first window comprising the two areas enabling different interaction inputs, divide an entire area of the flexible display into a first display area and a second display area according to a position of the folding.

According to one or more embodiments, the instructions may be configured to, when executed by the one or more processors individually or collectively, cause the electronic device to detect a folding event of the flexible display, and in response to the detection of the folding event, identify whether the first window of the application displayed in the state in which the flexible display is unfolded comprises a first area and a second area enabling different interaction inputs, and in response to the identification of the first window comprising the first area and the second area enabling different interaction inputs, separately display the first area in the first display area and the second area in the second display area divided by the folding, in the state in which the flexible display is at least partially folded.

According to one or more embodiments, in a state in which the first window of the application comprises a first area and a second area enabling different interaction inputs, the instructions may be configured to, when executed by the one or more processors individually or collectively, cause the electronic device to control the first area based on a first interaction input into the flexible display in a designated direction, and to control the second area based on a second interaction input into the flexible display in a different direction than the designated direction.

According to one or more embodiments, the instructions may be configured to, when executed by the one or more processors individually or collectively, cause the electronic device to, in a state in which the flexible display is in an unfolded states and a first area of the first window is controlled based on a first interaction input in a designated direction, and a second area of the first window is controlled based on a second interaction input in a different direction than the designated direction, the instructions may be configured to, when executed by the one or more processors individually or collectively, cause the electronic device to separately display the first area controlled based on the first interaction input in the designated direction in the first display area and the second area controlled based on the second interaction input in a different direction than the designated direction in the second display area divided by the folding, in a state in which the flexible display is at least partially folded.

Figure 7:
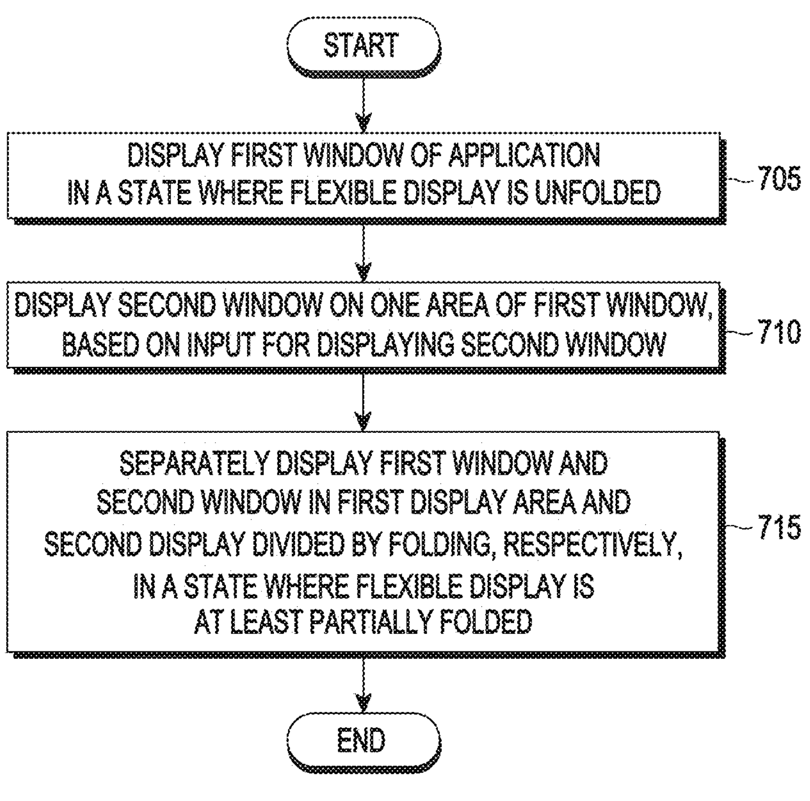
FIG. 7 is a flowchart illustrating an operation of an electronic device according to one or more embodiments.

FIG. 7 is a flowchart illustrating an operation of an electronic device according to one or more embodiments. Referring to FIG. 7, a method of operating an electronic device with a flexible display may include operations 705 to 715. Each operation of the operation method of FIG. 7 may be performed by at least one of the electronic device (e.g., the electronic device 101 in FIGS. 1 to 5) or at least one processor (e.g., the processor 120 in FIG. 1 or the processor 520 in FIG. 5) of the electronic device. In one or more embodiments, at least one of operations 705 to 715 may be omitted, the order of some operations may be changed, or other operations may be added.

In operation 705, the electronic device 101 may display a first window of an application in a state where flexible display of the electronic device 101 is unfolded. The first window of the application may correspond to an execution screen of the application. For example, electronic device 101 may display a first window of an application in an entire display area that includes a first display area and a second display area in a state in which the flexible display is unfolded In operation 710, the electronic device 101 may display a second window on an area of the first window, based on an input for displaying the second window. For example, the electronic device 101 may display a second window to partially overlay at least a portion of the first window. For example, the electronic device 101 may receive a selection of one of items included in the execution screen. For example, the electronic device 101 may detect a selection of an item (e.g., a specific area, icon, text, or number) on the first window. The selection may include a hovering or touch event of a touch input (e.g., a finger or a stylus pen). The electronic device 101 may display the second window that provides content (or detailed information) associated with the execution screen, based on the selection.

According to one or more embodiments, the first window may be controlled based on an interaction input in a designated direction, and the second window may be controlled based on an interaction input in the designated direction or a different direction.

According to one or more embodiments, in the state where the display is unfolded, one of the first window and the second window may be in an active state in which an interaction input is enabled.

In operation 715, in the state where the flexible display is at least partially folded, the electronic device 101 may separately display the first window and the second window in the first display area and the second display area divided by folding, respectively. For example, the first window and the second window may be disposed in the first display area and the second display area, respectively.

According to one or more embodiments, the electronic device 101 may detect a folding event of the display, and in response to the detection of the folding event, separately display the first window and the second window in the first display area and the second display area, respectively based on a hinge of the flexible display.

According to one or more embodiments, the first window may correspond to the execution screen of the application, and the second window may include content associated with the execution screen of the application.

According to one or more embodiments, in the state where the display is at least partially folded, each of the first window and the second window may be in the active state in which an interaction input is enabled. According to one or more embodiments, the first window displayed in the first display area may be controlled based on an interaction input in a designated direction, and the second window displayed in the second display area may be controlled based on an interaction input in the designated direction or a different direction.

According to one or more embodiments, the electronic device 101 may detect a folding event of the display. In response to the detection of the folding event, the electronic device 101 may identify whether the first window and the second window enable different interaction inputs.

According to one or more embodiments, the electronic device 101 may separately display the first window and the second window in the first display area and the second display area, respectively, in response to the identification of the first window and the second window enabling different interaction inputs.

According to one or more embodiments, the electronic device 101 may detect a folding event of the display, and in response to the detection of the folding event, identify whether the first window of the application displayed in the state where the display is unfolded includes a first area and a second area enabling different interaction inputs. In response to the identification of the first window including the first area and the second area enabling different interaction inputs, the electronic device 101 may separately display the first area and the second area in the first display area and the second display area divided by folding, respectively, in the state where the display is at least partially folded.

According to one or more embodiments, when the first window of the application includes a first area and a second area enabling different interaction inputs, the first area may be controlled based on an interaction input in a designated direction, and the second area may be controlled based on an interaction input in a different direction.

Figure 8:
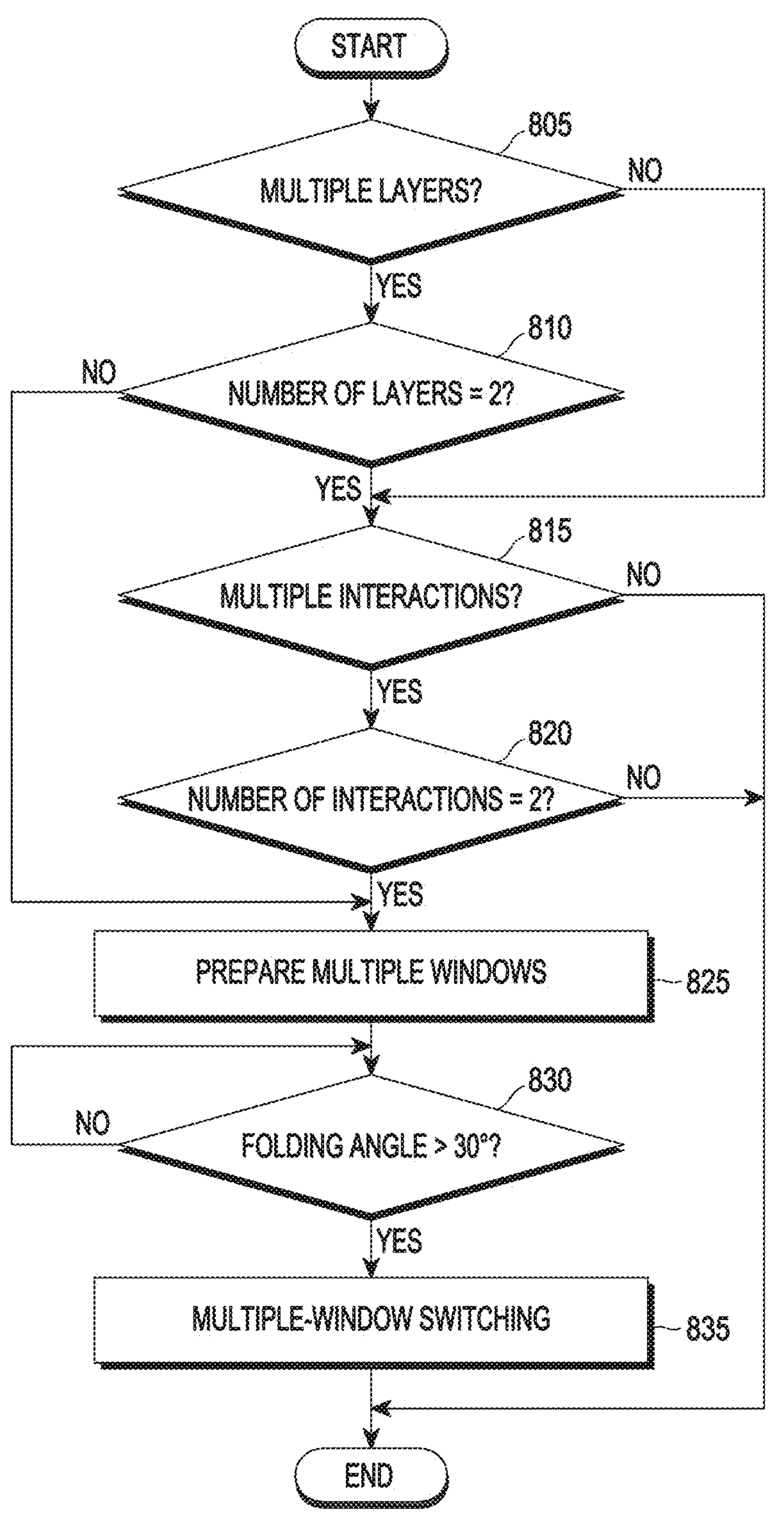
FIG. 8 is a flowchart illustrating an operation of operating multiple windows in response to a folding event according to one or more embodiments.
Figure 9:
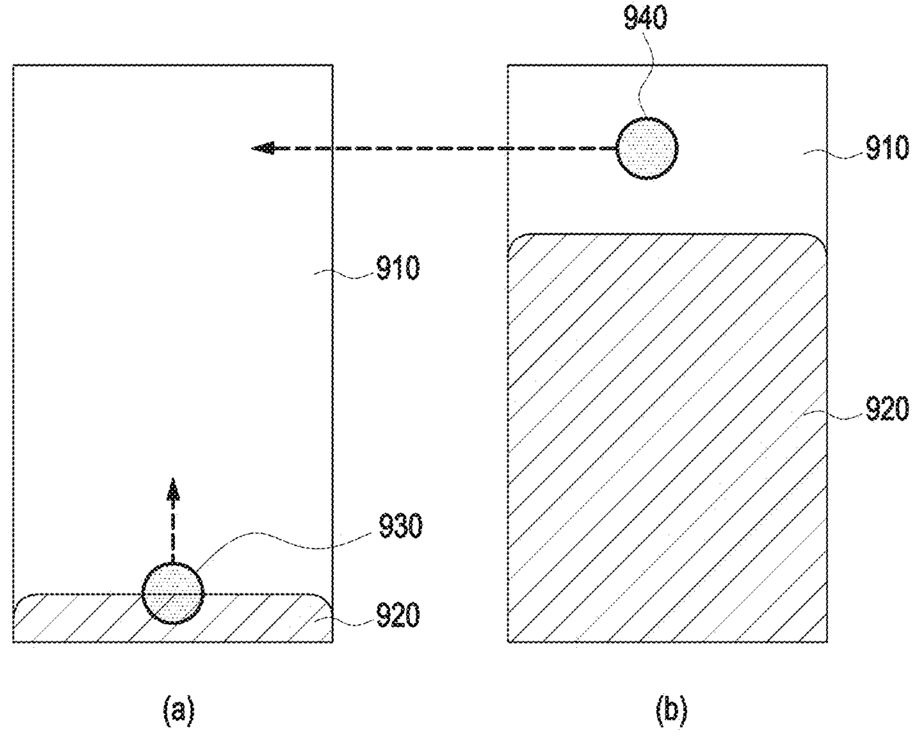
FIG. 9 is a diagram illustrating multiple layers according to one or more embodiments.
Figure 9:
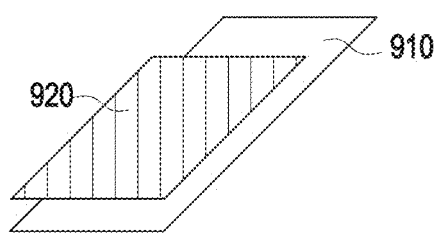
Figure 10:
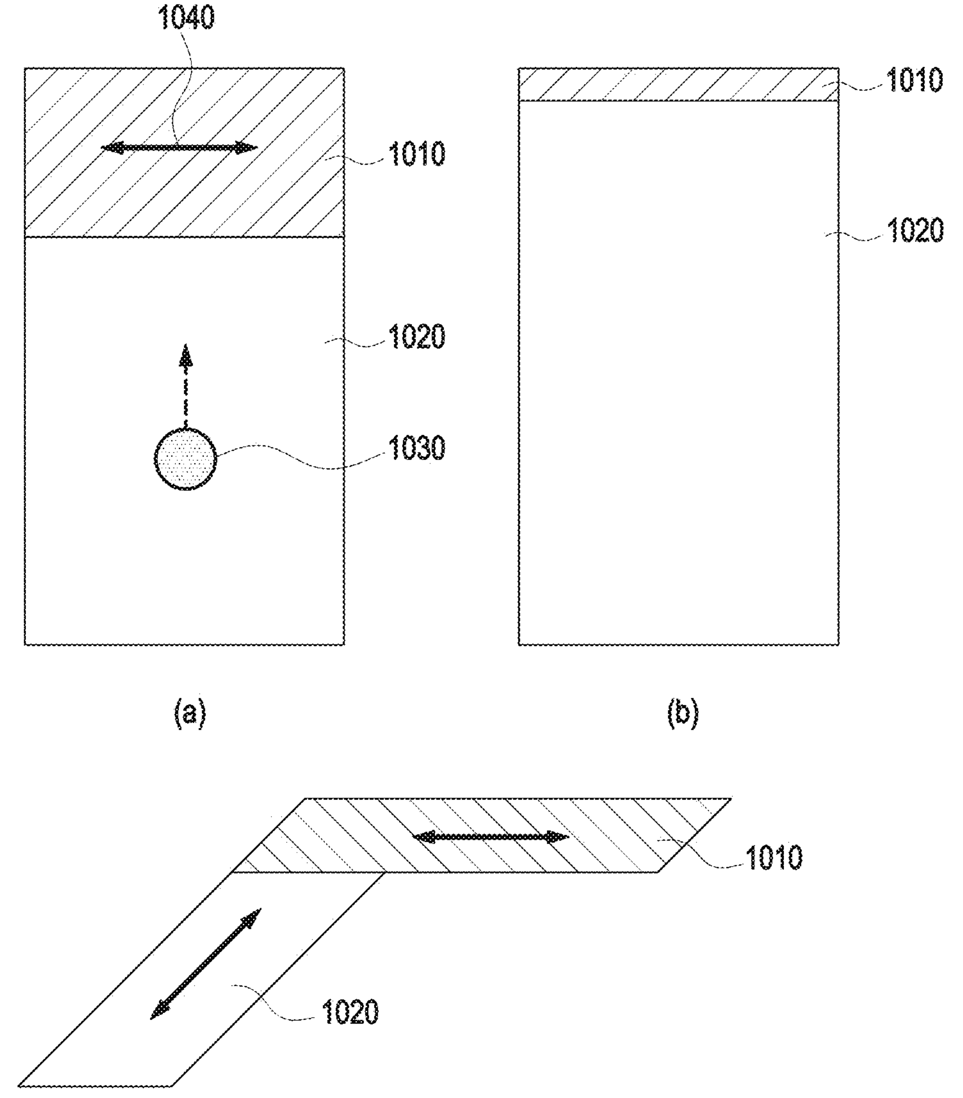
FIG. 10 is a diagram illustrating multiple interactions according to one or more embodiments.
Figure 11:
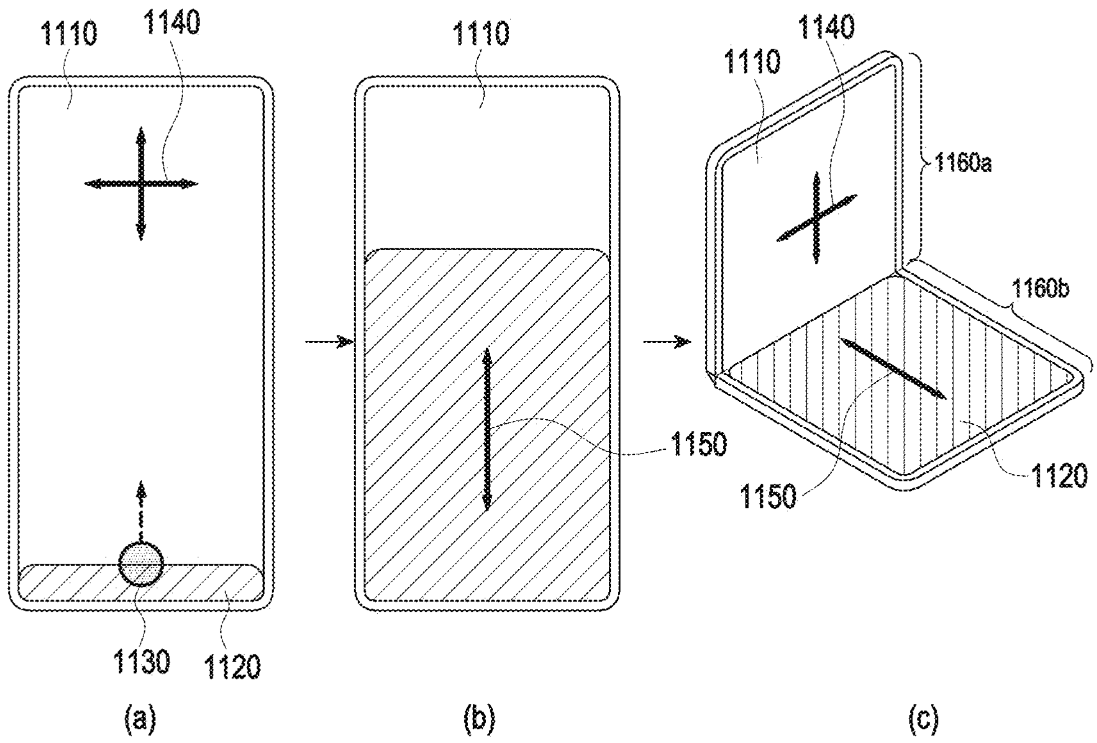
FIG. 11 is a diagram illustrating a case in which with multiple windows displayed, inputs to areas divided by folding are independent of each other according to one or more embodiments.
Figure 12:
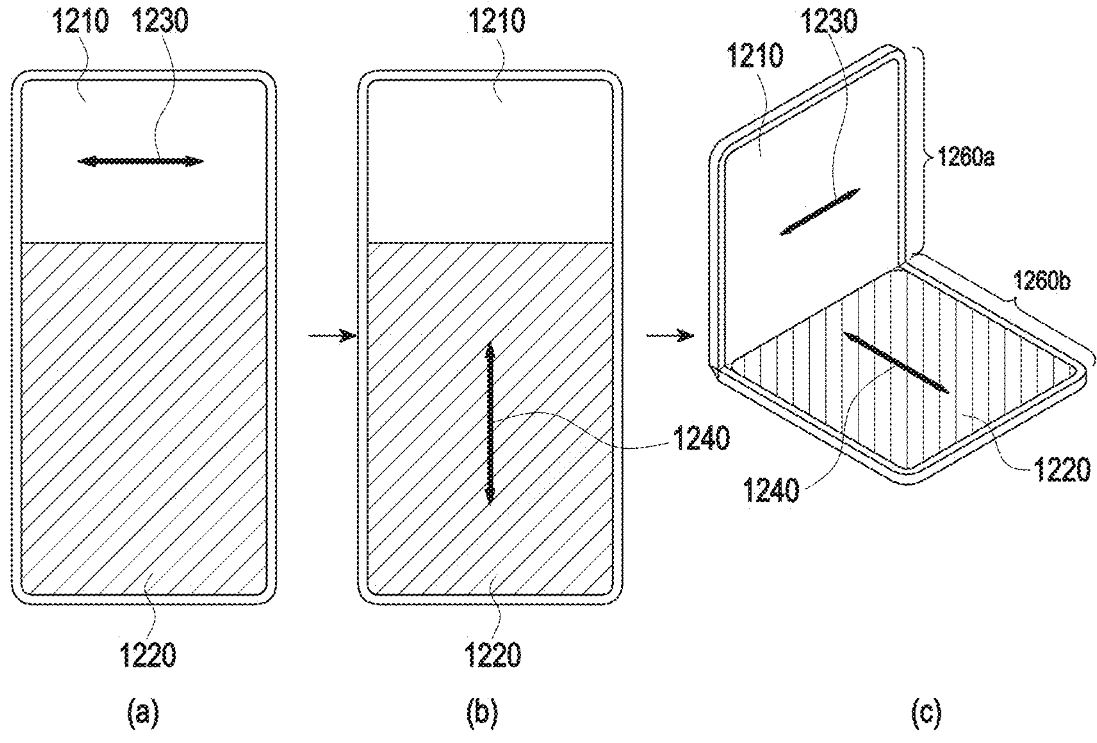
FIG. 12 is a diagram illustrating a case in which with divided areas displayed, inputs to areas divided by folding are independent of each other according to one or more embodiments.

FIG. 8 is a flowchart illustrating an operation of operating multiple windows in response to a folding event according to one or more embodiments. Referring to FIG. 8, an operation method of an electronic device with a flexible display may include operations 805 to 835. Each operation of the operation method of FIG. 8 may be performed by at least one of the electronic device (e.g., the electronic device 101 in FIGS. 1 to 5) or at least one processor (e.g., the processor 120 in FIG. 1 or the processor 520 in FIG. 5) of the electronic device. In one or more embodiments, at least one of operations 805 to 835 may be omitted, the order of some operations may be changed, or other operations may be added. To help understand the description of FIG. 8, reference may be made to FIGS. 9 to 12. FIG. 9 is a diagram illustrating multiple layers according to one or more embodiments, FIG. 10 is a diagram illustrating multiple interactions according to one or more embodiments, FIG. 11 is a diagram illustrating a case in which with multiple windows displayed, inputs to areas divided by folding are independent of each other according to one or more embodiments, and FIG. 12 is a diagram illustrating a case in which with divided areas displayed, inputs to areas divided by folding are independent of each other according to one or more embodiments.

According to one or more embodiments, the operation of FIG. 8 includes operations for operating multiple windows, upon detection of occurrence of a folding event in the electronic device 101.

In operation 805, the electronic device 101 may identify whether it is multi-layered. For example, the electronic device 101 may identify whether it is multi-layered, upon detection of occurrence of a folding event. In response to the identification of multiple layers, the electronic device 101 may identify whether the number of layers is 2 in operation 810. On the contrary, when multiple layers are not identified in operation 805, the electronic device 101 may perform operation 815.

For example, in response to an input 930 for displaying a second window 920 on a first window 910 as in FIG. 9(*a*), the electronic device 101 may display the second window 920 overlapping at least a portion of the first window 910 as in FIG. 9(*b*). In this case, when the first window 910 and the second window 920 have a layered structure in which they are stacked, the electronic device 101 may identify them as multiple layers. In the case of the multi-layer structure, an input may be enabled on one of the first window 910 and the second window 920. Therefore, when a user input 940 occurs on the first window 910 as in FIG. 9(*b*), the electronic device 101 may remove the display of the second window 920 as in FIG. 9(*a*).

When the number of layers is 2 in operation 810, the electronic device 101 may identify multiple interactions in operation 815. In response to the identification of the multiple interactions, the electronic device 101 may identify whether the number of interactions is 2 in operation 820. On the contrary, when multiple interactions are not identified, the electronic device 101 may terminate the operation of operating multiple windows in response to a folding event.

When the number of interactions is 2 in operation 820, the electronic device 101 may prepare multiple windows in operation 825. For example, the electronic device 101 may detect whether a folding event for operating multiple windows occurs. For example, as in FIG. 10(*a*), when a screen (e.g., an application execution screen) includes a first area 1010 and a second area 1020, the first area 1010 may be controlled based on an interaction input 1040 in a designated direction, and the second area 1020 may be controlled based on an interaction input 1030 in a different direction. Accordingly, the size of the second area 1020 may be changed based on the interaction input 1030 in the different direction, as illustrated in FIG. 10(*b*).

It has been described with reference to FIG. 8 that since the flexible display is divided into two areas by being folded in half, the number of layers is two, and the number of interactions is two, by way of example. However, when the electronic device 101 has a different form factor, the number of areas divided by folding may be two or more. For example, a form factor in which one portion of the flexible display is in-folded and the other portion is out-folded may be referred to as a Z-folding structure, and in this case, the electronic device 101 may have a form factor that includes both in-folding and out-folding. Accordingly, since the number of divided areas may be plural according to the Z-folding structure, windows based on multiple layers and multiple interactions may be disposed in each divided area.

In operation 830, the electronic device 101 may identify whether a folding angle is greater than a specified angle (e.g., 30 degrees). When the folding event is not detected or the folding angle is less than the specified angle, the operation of detecting a folding event may be performed continuously or periodically. Alternatively, when the folding angle is less than the specified angle, the operation of operating multiple windows in response to the folding event may be terminated.

When the folding angle is greater than the specified angle (e.g., 30 degrees) in operation 830, the electronic device 101 may perform multi-window switching in operation 835.

For example, in the case of the method in which two or more windows are displayed overlapped on one screen, the electronic device 101 may display a second window 1120 overlapped on at least a portion of the first window 1110 as in FIG. 11(*b*), in response to an input 1130 for displaying the second window 1120 on the first window 1110 as in FIG. 11(*a*).

In response to the folding event, the electronic device 101 may dispose the first window 1110 in a first display area 1160*a* divided by folding and dispose the second window 1120 in a second display area 1160*b*, as illustrated in FIG. 11(*c*). Accordingly, the first display area 1160*a* may be controlled based on an interaction input 1140 in a designated direction, and the second display area 1160*b* may be controlled based on an interaction input 1150 in a different direction.

For example, in the case of the method in which one screen is displayed divided into two or more areas as in FIG. 12(*a*), when one screen is displayed divided into a first area 1210 and a second area 1220, the first area 1210 may be controlled based on an interaction input 1230 in a designated direction. Further, as illustrated in FIG. 12(*b*), the second area 1220 may be controlled based on an interaction input 1240 in a different direction from the designated direction.

In response to the folding event, the electronic device 101 may dispose the first area 1210 in a first display area 1260*a* divided by folding and dispose the second area 1220 in a second display area 1260*b*, as illustrated in FIG. 12(*c*). Accordingly, the first display area 1260*a* may be controlled based on an interaction input 1230 in a designated direction, and the second display area 1260*b* may be controlled based on an interaction input 1240 in a different direction.

Figure 13:
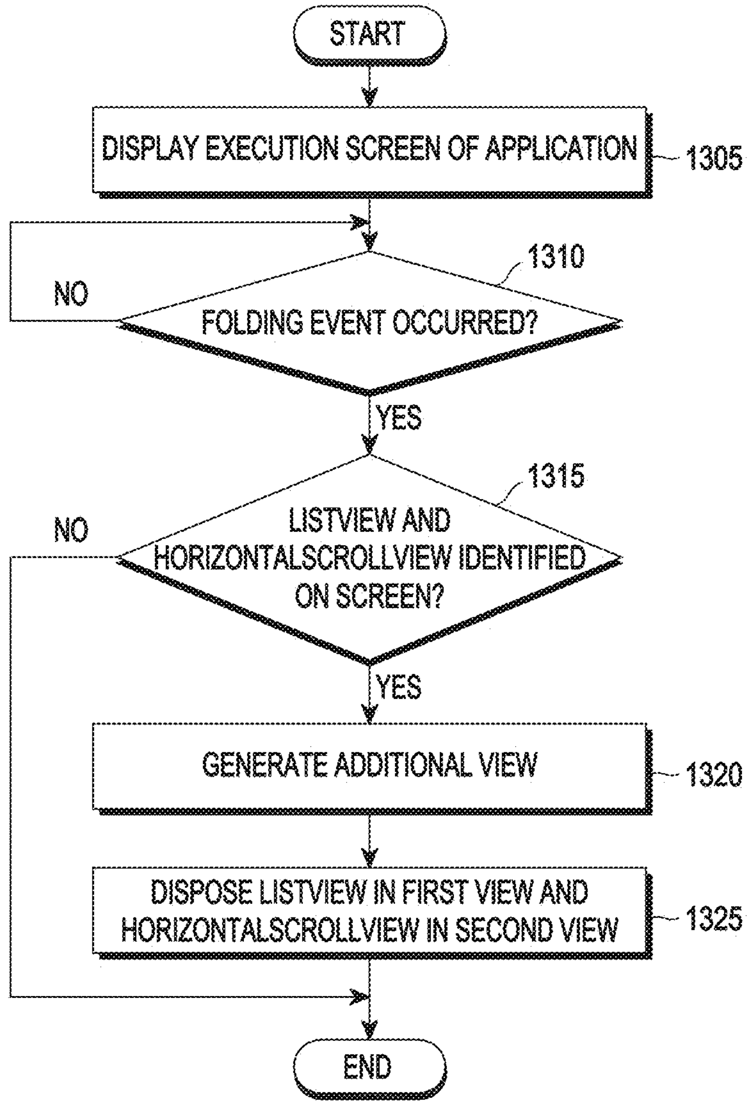
FIG. 13 is a flowchart illustrating an operation of an electronic device, when there are different interaction inputs on one screen according to one or more embodiments.
Figure 14:
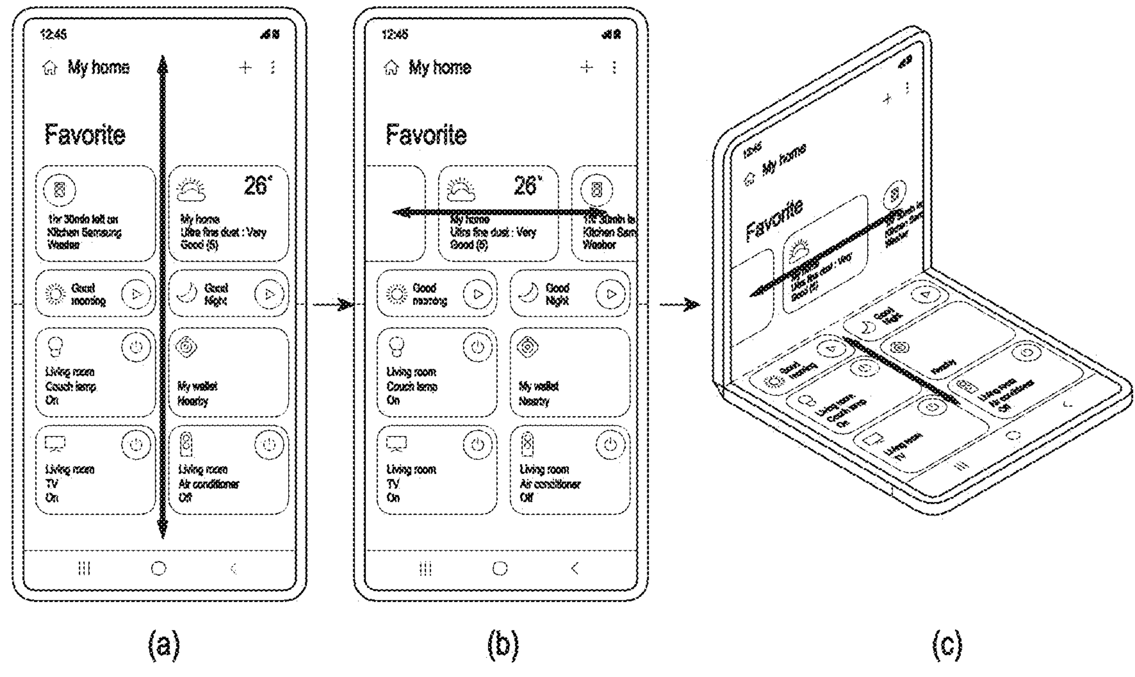
FIG. 14 is a diagram illustrating screens on which an execution screen of a first application is independently displayed in each of areas divided by folding according to one or more embodiments.

FIG. 13 is a flowchart illustrating an operation of an electronic device when the electronic device is folded, in the presence of different interaction inputs on one screen according to one or more embodiments. Each operation of FIG. 13 may be performed by at least one of the electronic device (e.g., the electronic device 101 in FIGS. 1 to 5) or at least one processor (e.g., the processor 120 in FIG. 1 or the processor 520 in FIG. 5) of the electronic device. In one or more embodiments, at least one of operations 1305 to 1325 may be omitted, the order of some operations may be changed, or other operations may be added. To help understanding of FIG. 13, reference will be made to FIG. 14. FIG. 14 is a diagram illustrating exemplary screens displaying an execution screen of a first application independently in each of areas divided by folding according to one or more embodiments.

In operation 1305, the electronic device 101 may display an execution screen of an application. For example, when the display is in the unfolded state, the execution screen of the application may be displayed to occupy the entire screen of the display, as illustrated in FIG. 14(*a*). According to one or more embodiments, a first area of the execution screen of the application may be controlled based on an interaction input in a first direction. Further, as illustrated in FIG. 14(*b*), a second area of the application may be controlled based on an interaction input in a second direction.

In operation 1310, the electronic device 101 may identify whether a folding event occurs. When the occurrence of the folding event is not detected, the execution screen of the application may be maintained displayed.

On the other contrary, upon detection of the occurrence of the folding event, the electronic device 101 may determine whether a list view and a horizontal scroll view are identified on the execution screen in operation 1315. For example, referring to FIG. 14(*a*), the list view may correspond to the first area of the execution screen of the application controlled based on an interaction input in the first direction. Further, referring to FIG. 14(*b*), the horizontal scroll view may correspond to the second area of the execution screen of the application controlled based on an interaction input in the second direction. As illustrated in FIGS. 14(*a*) and 14(*b*), the execution screen of the application may include areas enabling different interaction inputs.

In operation 1320, the electronic device 101 may create an additional view in response to the execution screen including the list view and the horizontal scroll view. In operation 1325, the electronic device 101 may dispose the list view in a first view and the horizontal scroll view in a second view. For example, the list view and the horizontal scroll view may be provided through separate layers (e.g., the first view and the second view). The first view and the second view may refer to areas divided by folding in a multi-window environment. For example, referring to FIG. 14(*c*), the first view may correspond to a first display area, and the second view may correspond to a second display area. The views (e.g., the list view and the horizontal scroll view) may be provided in an overlaid manner in the first display area and the second display area. As illustrated in FIG. 14(*c*), different interaction inputs may be applied independently in the views (e.g., the list view and the horizontal scroll view) disposed, respectively, in the areas (e.g., the upper area and the lower area) divided by folding. Accordingly, different interaction inputs may be simultaneously received through the areas divided by folding.

Figure 15:
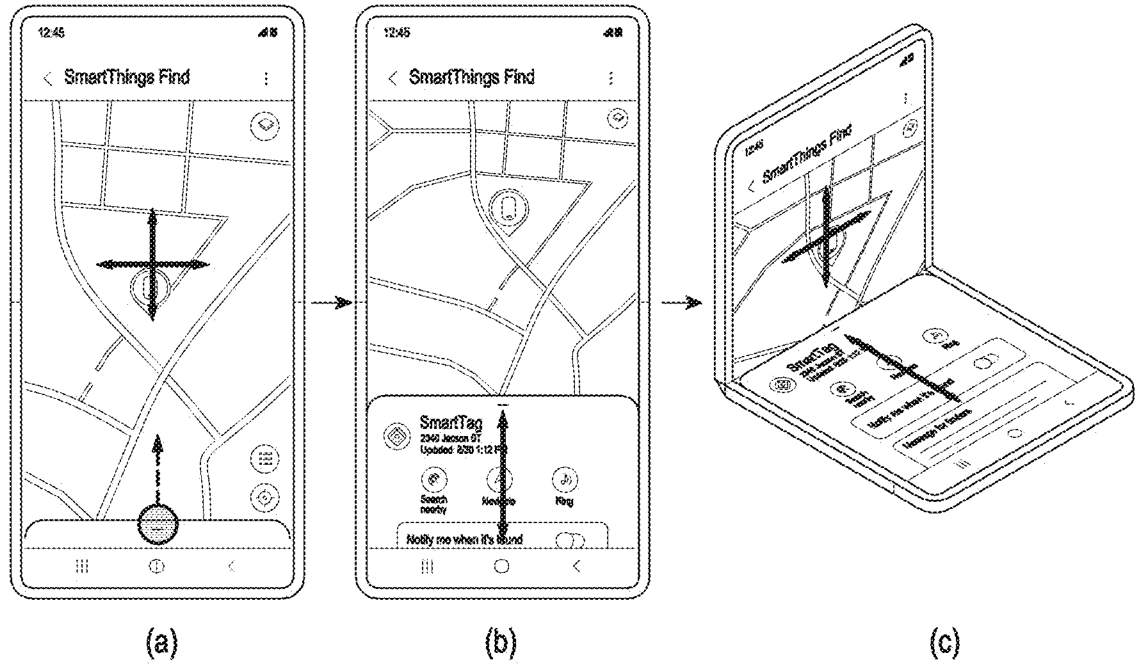
FIG. 15 is a diagram illustrating screens on which an execution screen of a second application is independently displayed in each of areas divided by folding according to one or more embodiments.

FIG. 15 is a diagram illustrating an example of screens displaying an execution screen of a second application independently through each of areas divided by folding according to one or more embodiments.

Referring to FIG. 15(*a*), when executing the second application (e.g., a map application), the user may manipulate a map display area by 4-direction navigation or in any direction on an area (or a first window) where a map is displayed. When the user selects an item (e.g., a specific location) related to the second application, an area (or a second window) including content (or detailed information) related to the map application may be displayed on the map display area, as illustrated in FIG. 15(*b*).

In response to detection of the occurrence of a folding event, the electronic device 101 may separately display the first window and the second window in areas divided by folding, respectively, as illustrated in FIG. 15(*c*). Accordingly, a different interaction input may be enabled in each area.

Figure 16:
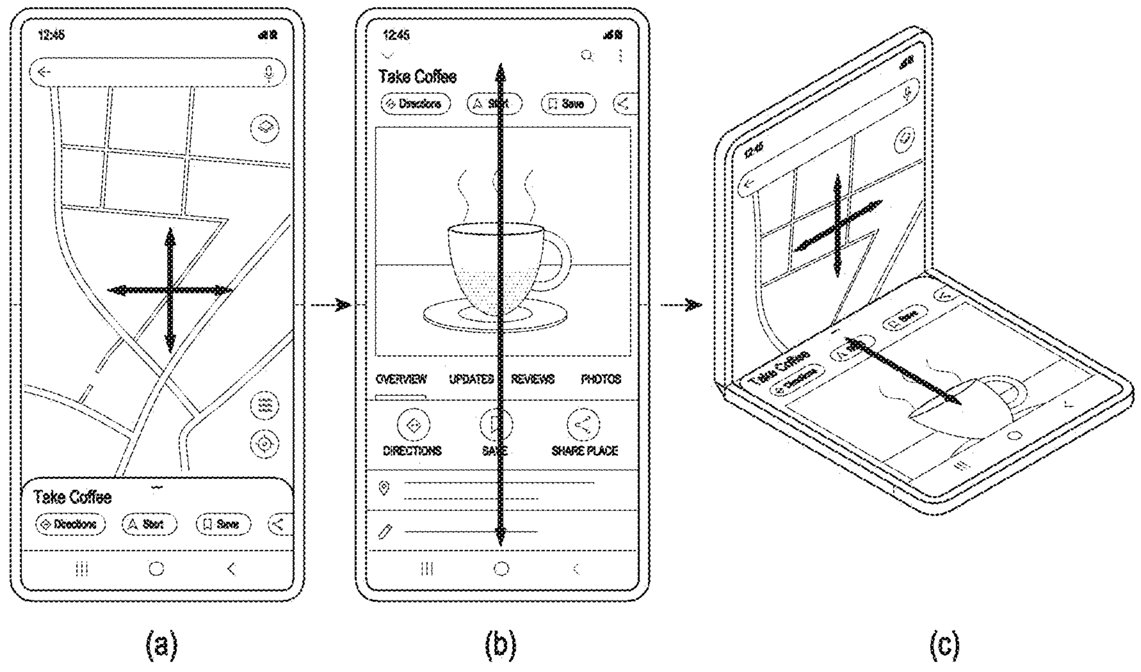
FIG. 16 is a diagram illustrating screens on which an execution screen of a second application is independently displayed in each of areas divided by folding according to one or more embodiments.

FIG. 16 is a diagram illustrating an example of screens displaying an execution screen of a second application independently in each of areas divided by folding according to one or more embodiments.

When the user selects an item (e.g., a specific location) related to the second application (e.g., map application), with an execution screen of the second application displayed, as illustrated in FIG. 16(*a*), an area (or second window) including content (or location information) related to the map application may be displayed, as illustrated in FIG. 16(*b*). Depending on the user's selection, the second window may be displayed to overlap the entirety or at least a portion of a first window. In response to detection of the occurrence of a folding event, the electronic device 101 may separately display the first window and the second window in areas divided by folding, respectively, as illustrated in FIG. 16(*c*). For example, when an upper area may be controlled based on an interaction input in a designated direction (e.g., four directions), a lower area may be controlled based on an interaction input in the same direction as or a different direction than the designated direction.

Figure 17:
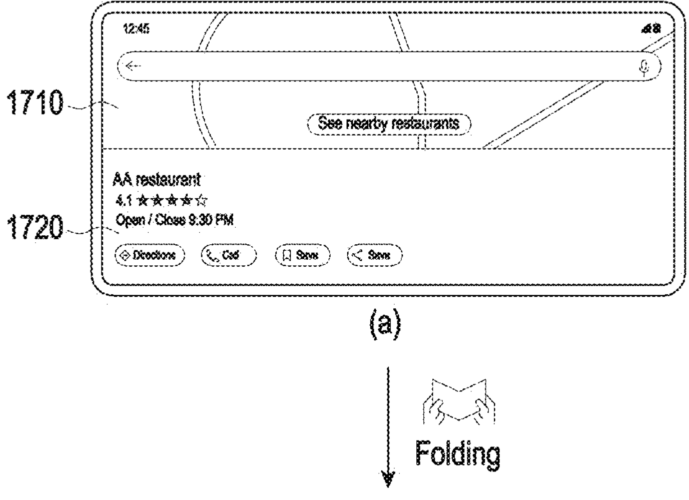
FIG. 17 is a diagram illustrating screens on which an execution screen of an application is independently displayed in each of areas divided by folding in a landscape mode of an electronic device of a second shape according to one or more embodiments.
Figure 17:
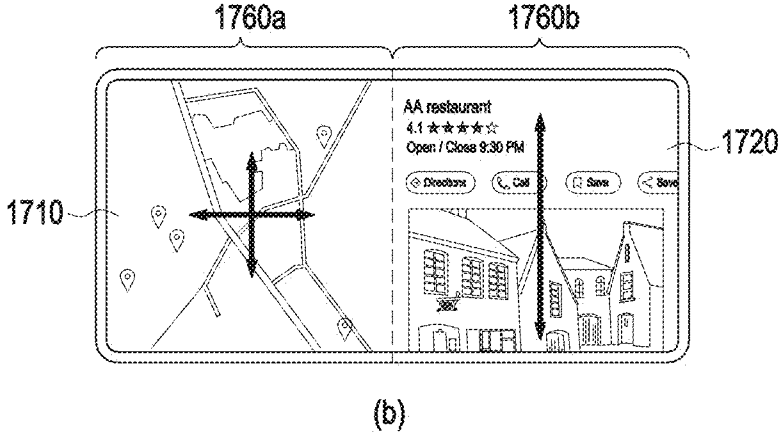

FIG. 17 is a diagram illustrating an example of screens displaying an execution screen of an application independently in each of areas divided by folding in a landscape mode of an electronic device of a second shape according to one or more embodiments.

FIG. 17 illustrates the landscape mode of the electronic device 101 of the second shape, as illustrated in FIG. 3A. In the landscape mode, when the display is in the unfolded state, a first window (or upper area) 1710 and a second window (or lower area) 1720 of the electronic device 101 may be displayed as illustrated in FIG. 17(*a*). When the electronic device 101 detects a folded state in which it is folded inwardly by a user's bending motion from both sides, the first window 1710 may be disposed in a first display area 1760*a* divided with respect to a folding axis, and the second window 1720 may be disposed in a second display area 1760*b*, as illustrated in FIG. 17(*b*). Since the first window 1710 and the second window 1720 enable different interaction inputs, when the first display area 1760*a* is controlled based on an interaction input in a designated direction, the second display area 1760*b* may also be controlled based on an interaction input in a different direction.

Figure 18:
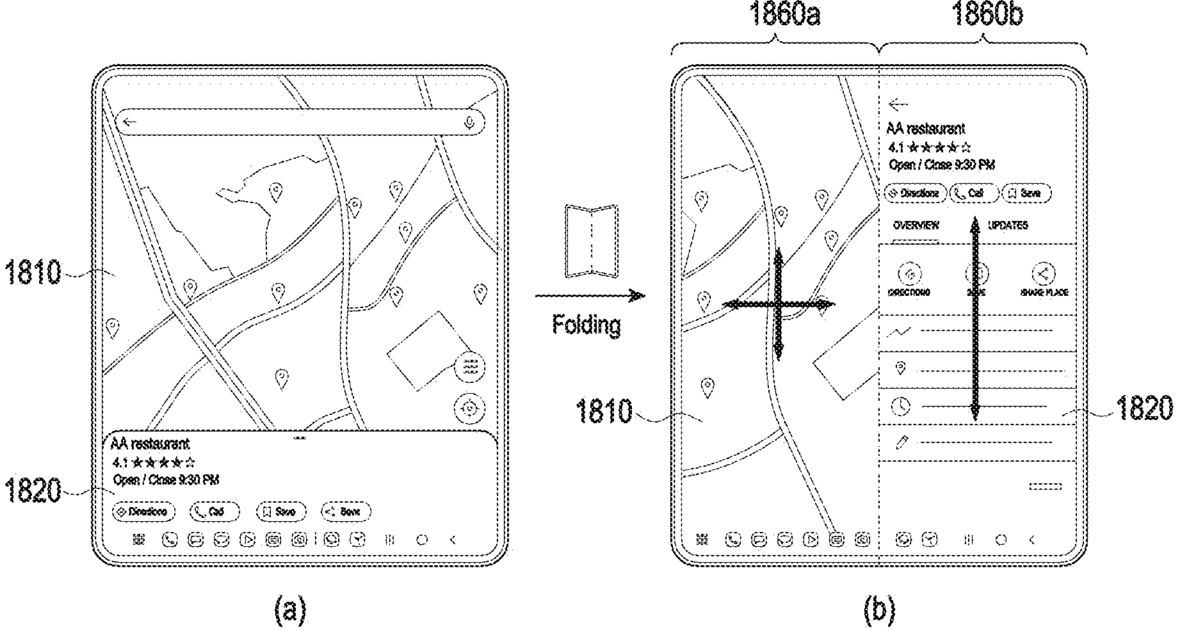
FIG. 18 is a diagram illustrating screens on which an execution screen of an application is independently displayed in each of areas divided by folding in a portrait mode of an electronic device of a first shape according to one or more embodiments.

FIG. 18 is a diagram illustrating an example of screens displaying an execution screen of an application is independently in each of areas divided by folding in a portrait mode of an electronic device of a first shape according to one or more embodiments.

FIG. 18 illustrates the portrait mode of the electronic device 101 of the first shape, as illustrated in FIG. 2. As illustrated in FIG. 18, the electronic device 101 may have the first shape that is longer in height than width on the front surface thereof. In the portrait mode, when the display is in the unfolded state, a first window 1810 and a second window 1820 of the electronic device 101 may be displayed as illustrated in FIG. 18(*a*). Although the first window 1810 and the second window 1820 enable different interaction inputs, only one window may be in the active state in which an interaction input is enabled.

When the electronic device 101 detects a folding state in which it is folded inwardly by the user's bending motion from both sides, the first window 1810 may be disposed in a first display area 1860*a* divided with respect to the folding axis, and the second window 1820 may be disposed in a second display area 1860*b*, as illustrated in FIG. 18(*b*). Since the first window 1810 and the second window 1820 enable different interaction inputs, when the first display area 1860*a* is controlled based on an interaction input in a designated direction, the second display area 1860*b* may also be controlled based on an interaction input in a different direction.

Figure 19:
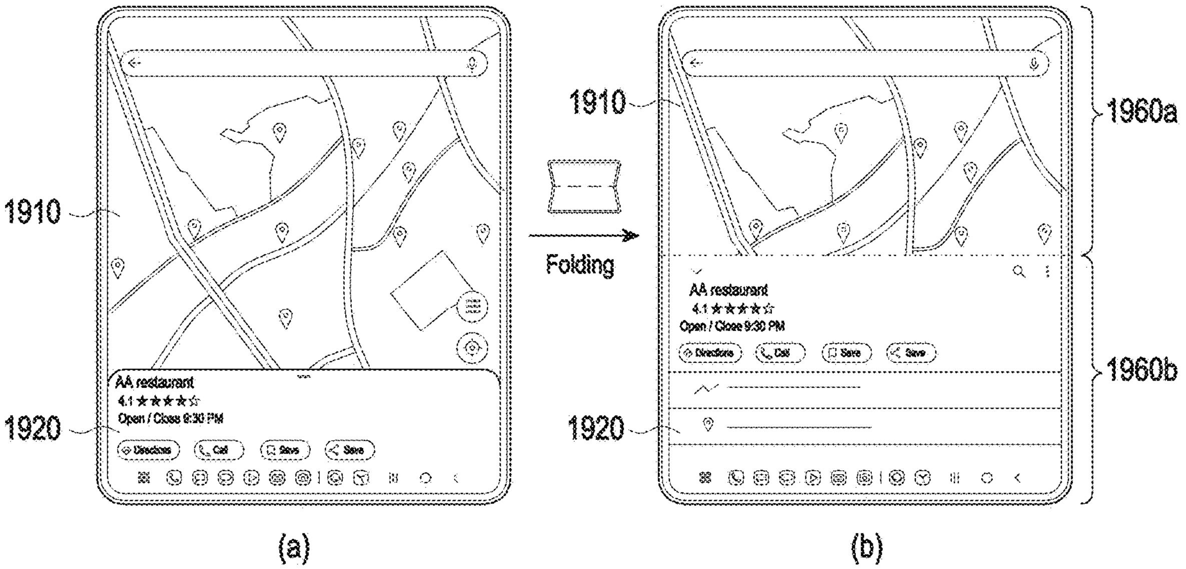
FIG. 19 is a diagram illustrating screens on which an execution screen of an application is independently displayed in each of areas divided by folding in a landscape mode of an electronic device of a first shape according to one or more embodiments.

FIG. 19 is a diagram illustrating an example of screens displaying an execution screen of an application is independently in each of areas divided by folding in a landscape mode of an electronic device of a first shape according to one or more embodiments.

FIG. 19 illustrates the landscape mode of the electronic device 101 of the first shape, as illustrated in FIG. 2. A state in which one of two side surfaces of the body of the electronic device 101 of the first shape faces downward with respect to a folding axis may be referred to as the landscape mode. In the landscape mode, when the display is in the unfolded state, a first window 1910 and a second window 1920 of the electronic device 101 may be displayed, as illustrated in FIG. 19(*a*). Although the first window 1910 and the second window 1920 enable different interaction inputs, only one window may be in the active state where an interaction input is enabled, in the unfolded state.

When the electronic device 101 detects a folding state in which it is folded inwardly by the user's bending motion, the first window 1910 may be disposed in a first display area 1960*a* divided with respect to the folding axis, and the second window 1920 may be disposed in a second display area 1960*b*, as illustrated in FIG. 19(*b*). Since the first window 1910 and the second window 1920 enable different interaction inputs, when the first display area 1960*a* is controlled based on an interaction input in a designated direction, the second display area 1960*b* may also be controlled based on an interaction input in a different direction.

According to one or more embodiments, an execution screen of an application is divided into two areas according to a folding event of a bending of a flexible display, thereby enabling intuitive screen control through an independent interaction input to each divided area and thus improving usability.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as “A or B”, “at least one of A and B”, “at least one of A or B”, “A, B, or C”, “at least one of A, B, and C”, and “at least one of A, B, or C”, may include any one of, or all possible combinations of the items enumerated together in a corresponding one of the phrases. As used herein, such terms as “1st” and “2nd”, or “first” and “second” may be used to simply distinguish a corresponding component from another, and does not limit the components in other aspect (e.g., importance or order). It is to be understood that if an element (e.g., a first element) is referred to, with or without the term “operatively” or “communicatively”, as “coupled with”, “coupled to”, “connected with”, or “connected to” another element (e.g., a second element), it means that the element may be coupled with the other element directly (e.g., wiredly), wirelessly, or via a third element.

As used in connection with various embodiments of the disclosure, the term “module” may include a unit implemented in hardware, software, or firmware, and may interchangeably be used with other terms, for example, logic, logic block, part, or circuitry. A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term “non-transitory” simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer’s server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to one or more embodiments, a non-transitory storage medium may store instructions configured to enable the electronic device 101 to perform at least one operation, when executed by the at least one processor 120 or 520 of the electronic device. The at least one operation may include displaying a first window of an application in a state in which a flexible display of the electronic device is unfolded, displaying a second window on an area of the first window, based on an input for displaying the second window, and displaying the first window in a first display area and the second window in a second display area in a state in which the flexible display is at least partially folded, the first display area and the second display area being separate from each other and divided by a folding in the flexible display.

According to yet another aspect of the disclosure, a non-transitory storage medium storing instructions is configured to enable an electronic device to perform at least one operation when executed by at least one processor of the electronic device, the at least one operation includes: displaying a first window of an application in an entire display area that includes a first display area and a second display area in a state in which a flexible display of the electronic device is unfolded; displaying a second window to partially overlay at least a portion of the first window, based on an input for displaying the second window; detect a folding event of the flexible display using at least one sensor; in response to the detection of the folding event, displaying the first window in the first display area and the second window in the second display area in a state in which the flexible display is at least partially folded, the first display area and the second display area being separate from each other and divided by a folding in the flexible display.

While the disclosure has been illustrated and described with reference to one or more embodiments, it will be understood that the one or more embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiments described herein may be used in conjunction with any other embodiments described herein.

What is claimed is:

1. An electronic device, comprising: a flexible display; at least one sensor; at least one processor; and a memory storing instructions that, when executed by the one or more processors individually or collectively, cause the electronic device: display, via the flexible display, a first window of an application in an entire display area that includes a first display area and a second display area in a state in which the flexible display is unfolded; display, via the flexible display, a second window to partially overlay at least a portion of the first window, based on an input for controlling the second window to move in a designated direction; detect a folding event of the flexible display using the at least one sensor; and based on the detection of the folding event and the controlling of the second window, display, via the flexible display, the first window in the first display area and the second window in the second display area in a state in which the flexible display is at least partially folded, the first display area and the second display area being separate from each other and divided by a folding in the flexible display.

2. The electronic device of claim 1, wherein the instructions are further configured to, when executed by the one or more processors individually or collectively, cause the electronic device to:

control the first window based on a first interaction input into the flexible display in a another designated direction different from the designated direction.

3. The electronic device of claim 1, wherein, in the state in which the flexible display is unfolded, the first window or the second window is in an active state in which an interaction input is enabled, and wherein, in the state in which the flexible display is at least partially folded, each of the first window and the second window is in the active state in which the interaction input is enabled.

4. The electronic device of claim 1, wherein the instructions are further configured to, when executed by the one or more processors individually or collectively, cause the electronic device to:

in response to the detection of the folding event, separately display the first window in the first display area of the flexible display and the second window in the second display area of the flexible display based on a hinge of the flexible display.

5. The electronic device of claim 1, wherein the first window corresponds to an execution screen of the application, and the second window comprises content associated with the execution screen of the application.

6. The electronic device of claim 1, wherein the instructions are further configured to, when executed by the one or more processors individually or collectively, cause the electronic device to:

detect a folding event of the flexible display;

in response to the detection of the folding event, identify whether the first window and the second window enable different interaction inputs; and in response to the identification of the first window and the second window enabling different interaction inputs, separately display the first window in the first display area of the flexible display and the second window in the second display area of the flexible display.

7. The electronic device of claim 1, wherein the instructions are further configured to, when executed by the one or more processors individually or collectively, cause the electronic device to:

detect a folding event of the flexible display;

in response to the detection of the folding event, identify whether the first window of the application displayed in the state in which the flexible display is unfolded comprises two areas enabling different interaction inputs, respectively; and in response to the identification of the first window comprising the two areas enabling different interaction inputs, divide an entire area of the flexible display into the first display area and the second display area according to a position of the folding.

8. The electronic device of claim 1, wherein the instructions are further configured to, when executed by the one or more processors individually or collectively, cause the electronic device to:

detect a folding event of the flexible display;

in response to the detection of the folding event, identify whether the first window of the application displayed in the state in which the flexible display is unfolded comprises a first area and a second area enabling different interaction inputs, and in response to the identification of the first window comprising the first area and the second area enabling different interaction inputs, separately display the first area in the first display area and the second area in the second display area divided by the folding, in the state in which the flexible display is at least partially folded.

9. The electronic device of claim 1, wherein in a state in which the first window of the application comprises a first area and a second area enabling different interaction inputs, the instructions are further configured to, when executed by the one or more processors individually or collectively, cause the electronic device to:

control the first area based on a first interaction input into the flexible display in another designated direction; and control the second area based on a second interaction input into the flexible display in a different direction than the another designated direction.

10. The electronic device of claim 1, wherein in a state in which the flexible display is in an unfolded state and a first area of the first window is controlled based on a first interaction input in a designated direction, and a second area of the first window is controlled based on a second interaction input in a direction different than the designated direction, the instructions are further configured to, when executed by the one or more processors individually or collectively, cause the electronic device to separately display the first area controlled based on the first interaction input in the designated direction in the first display area and the second area controlled based on the second interaction input in a different direction than the designated direction in the second display area divided by the folding, in a state in which the flexible display is at least partially folded.

11. A method of operating an electronic device including a flexible display, the method comprising: displaying a first window of an application in an entire display area that includes a first display area and a second display area in a state in which the flexible display is unfolded; displaying a second window to partially overlay at least a portion of the first window, based on an input for controlling the second window to move in a designated direction; detect a folding event of the flexible display using at least one sensor; and based on the detection of the folding event and the controlling of the second window, displaying the first window in the first display area and the second window in the second display area in a state in which the flexible display is at least partially folded, the first display area and the second display area being separate from each other and divided by a folding in the flexible display.

12. The method of claim 11, further comprising:

controlling the first window based on a first interaction input into the flexible display in another designated direction different from the designated direction.

13. The method of claim 11, wherein, in the state in which the flexible display is unfolded, the first window or the second window is in an active state in which an interaction input is enabled, and wherein, in the state in which the flexible display is at least partially folded, each of the first window and the second window is in the active state in which the interaction input is enabled.

14. The method of claim 11, wherein the first window corresponds to an execution screen of the application, and wherein the second window comprises content associated with the execution screen of the application.

15. The method of claim 11, further comprising:

in response to the detection of the folding event, identifying whether the first window and the second window enable different interaction inputs; and in response to the identification of the first window and the second window enabling different interaction inputs, separately displaying the first window in the first display area of the flexible display and the second window in the second display area of the flexible display based on a hinge of the flexible display.

16. A non-transitory storage medium storing instructions configured to enable an electronic device to perform at least one operation when executed by at least one processor of the electronic device, the at least one operation comprising: displaying a first window of an application in an entire display area that includes a first display area and a second display area in a state in which a flexible display of the electronic device is unfolded; displaying a second window to partially overlay at least a portion of the first window, based on an input for controlling the second window to move in a designated direction; detect a folding event of the flexible display using at least one sensor; and based on the detection of the folding event and the controlling of the second window, displaying the first window in the first display area and the second window in the second display area in a state in which the flexible display is at least partially folded, the first display area and the second display area being separate from each other and divided by a folding in the flexible display.

17. The non-transitory storage medium of claim 16, wherein the at least one operation further comprises:

controlling the first window based on a first interaction input into the flexible display in another designated direction different from the designated direction.

18. The non-transitory storage medium of claim 16, wherein, in the state in which the flexible display is unfolded, the first window or the second window is in an active state in which a first interaction input is enabled, and wherein, in the state in which the flexible display is at least partially folded, each of the first window and the second window is in the active state in which a second interaction input is enabled.

19. The non-transitory storage medium of claim 16, wherein the first window corresponds to an execution screen of the application, and wherein the second window comprises content associated with the execution screen of the application.

20. The non-transitory storage medium of claim 16, wherein the at least one operation further comprises:

in response to the detection of the folding event, identifying whether the first window and the second window enable different interaction inputs; and in response to the identification of the first window and the second window enabling different interaction inputs, separately displaying the first window in the first display area of the flexible display and the second window in the second display area of the flexible display based on a hinge of the flexible display.

* * * * *